United States Patent [19]

Nagao et al.

[11] Patent Number: 6,100,998
[45] Date of Patent: Aug. 8, 2000

[54] PRINT PROCESSOR WITH EFFICIENT MEMORY USE

[75] Inventors: Takashi Nagao; Yuji Onozawa; Hiroshi Ishikawa; Noriaki Seki; Koki Uwatoko; Satoshi Kubota; Koji Adachi; Tetsuro Kawata; Kazutaka Hirata; Yoshinori Wada; Masahiko Koyanagi, all of Nakai-machi, Japan

[73] Assignee: Fuji Xerox Co., Ltd., Tokyo, Japan

[21] Appl. No.: 08/975,934

[22] Filed: Nov. 21, 1997

[30] Foreign Application Priority Data

Nov. 29, 1996 [JP] Japan ..................................... 8-320244
Dec. 2, 1996 [JP] Japan ..................................... 8-321280

[51] Int. Cl.$^7$ ..................................................... G06K 15/00
[52] U.S. Cl. ............................................. 358/1.9; 358/404
[58] Field of Search .................. 358/1.9, 1.3, 1.13–1.17, 358/404, 426, 261.1–261.4, 444

[56] References Cited

U.S. PATENT DOCUMENTS

| 5,138,561 | 8/1992 | Crowe ..................................... 395/103 |
| 5,602,976 | 2/1997 | Cooper et al. .......................... 395/116 |
| 5,850,504 | 12/1998 | Cooper et al. .......................... 395/117 |
| 5,913,018 | 6/1999 | Sela ......................................... 395/116 |

FOREIGN PATENT DOCUMENTS 6-290007  10/1994  Japan .
6-344639  12/1994  Japan .

*Primary Examiner*—Thomas D. Lee
*Assistant Examiner*—Stephen Brinich
*Attorney, Agent, or Firm*—Oliff & Berridge, PLC

[57] ABSTRACT

A print processor is disclosed which comprises: an input unit for inputting print data including at least either texts or graphics and described in predetermined drawing instructions; an image output unit for outputting images based on data having a predetermined data structure; an intermediate data generating unit for generating intermediate data from the print data, the intermediate data being expressed in a format which is higher in abstract terms than the data structure and which includes at least one basic graphic; an rasterizing process unit for rasterizing the intermediate data into the data structure and for supplying the image output unit with the intermediate data thus rasterized; a determining unit for determining a number and a size of the basic graphics constituting the intermediate data generated by the intermediate data generating unit; an rasterizing time predicting unit for predicting the time it takes the rasterizing process unit to rasterize the intermediate data on the basis of the number and the size of the basic graphics determined by the determining unit; and a control unit for determining an image output speed of the image output unit in accordance with the time predicted by the rasterizing time predicting unit.

18 Claims, 25 Drawing Sheets

- CONTROL POINTS ON ORIGINAL BEZIER CURVE
- CONTROL POINTS ON TWO BEZIER CURVE SEGMENTS AFTER DIVISION
- || INDICATIVE OF MEDIAN DIVISION

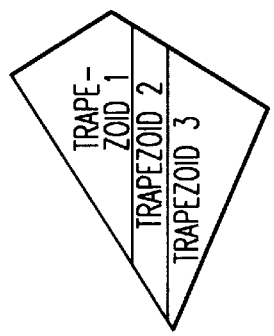
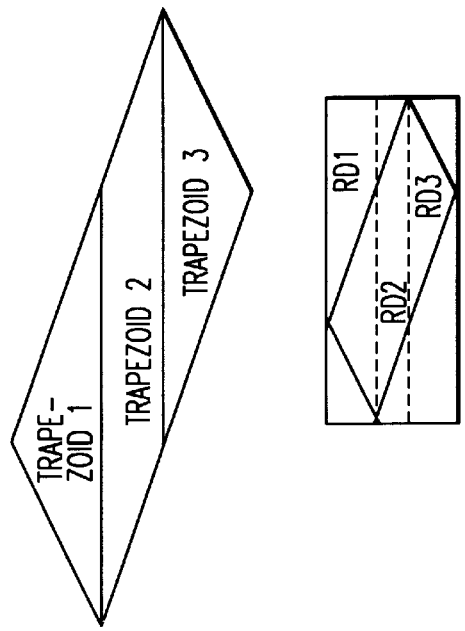
FIG. 8A
| OID | OTYPE | COLOR | TRAPEZOID COUNT(3) | TRAPEZOID 1 | TRAPEZOID 2 | TRAPEZOID 3 |
OID :INCREMENTED IN ORDER OF DRAWING INSTRUCTIONS
OTYPE :CHARACTER, FIGURE, IMAGE
COLOR :CMYK VALUE
DATA ON CHARACTER/FIGURE DRAWING INSTRUCTION
FIG. 8B
| OID | OTYPE | TRAPEZOID COUNT(3) | RD2 | RH2 | TRAPEZOID 1 | RH1 | RD1 |
| TRAPEZOID 2 | TRAPEZOID (3) | RH3 | RD3 |
RH : IMAGE HEADER
RD : IMAGE DATA
DATA ON IMAGE DRAWING INSTRUCTION

INTERMEDIATE DATA BEING INPUT TO INPUT BUFFER A

INTERMEDIATE DATA BEING INPUT TO INPUT BUFFER B

PRINT PROCESSOR WITH EFFICIENT MEMORY USE

BACKGROUND OF THE INVENTION

1. Field of the Invention

The present invention relates to a print processor that utilizes a page printer.

2. Description of the Related Art Along with the recent development of small, high-speed xerographic page printers suitable for digital printing has come the widespread use of novel print processors that go beyond the traditional concept of text-centered information printing. Such print processors utilize description languages that allow images, graphics and texts to be uniformly processed altogether. The processing includes enlargement, rotation, transformation and other desired handling of graphics and texts. PostScript (TM of Adobe Systems, U.S.), Interpress (TM of Xerox Corp., U.S.), Acrobat (TM of Adobe Systems) and GDI (Graphics Device Interface, TM of Microsoft Corp., U.S.) are well-known, representative description languages.

Print data prepared in description language include descriptive instructions arranged in a desired order for describing images, graphics and texts positioned as desired within a page. To have such data printed by a printer related to the present invention requires that the print data be rasterized into raster graphics before printing. The expansion involves forming raster scanning lines by rasterizing the target data into a series of individual dots or pixels arranged across part of or all of a page, the scanning lines being generated successively from top to bottom within one page. Conventional page printers rasterize the print data of the entire page into raster graphics before printing and have the send data stored in a page buffer memory. To store the raster data about the whole page requires installing a memory of a large capacity. State-of-the-art xerographic color page printers require page buffer memories of particularly large capacities for two reasons: because the printers need to deal with toners of four colors (cyan (C), magenta (M), yellow (Y) and black (Bk)), and because the printers generally use a plurality of bits of information per pixel to meet the demand for higher picture quality than monochromatic page printers.

Against the background of the massive memory requirement, the so-called band memory technique has been proposed recently as a viable way to reduce the memory capacity and to lower costs accordingly. The band memory technique does not envisage rasterizing all print data of a single page into raster graphics before printing by a page printer. Instead, the target print data prepared in description language are converted to relatively simple intermediate data that may be rasterized into raster graphics faster than the original print data. The page is divided into a plurality of contiguous regions called bands. The intermediate data representing the respective bands are first stored and then transferred successively to a raster graphics rasterizing unit whereby the intermediate data are placed in buffer memory locations corresponding to the bands. The band memory technique requires a new memory arrangement for storing the intermediate data but achieves reductions in the capacity of the buffer memory for accommodating massive raster data. Generally, however, the band memory technique requires that before the end of the printing of raster data about a given band, the expansion of intermediate data into raster data for the next band be completed. In such cases, the expansion of the intermediate data into raster data may not be finished in time if the print data include instructions for drawing complicated graphics or for drawing images of huge data quantities, or if a specific band within a page comprises instructions for drawing complicated graphics or images.

A number of solutions to the above problems regarding the band memory technique have been proposed. Disclosures that bear on the present invention are made illustratively by Japanese Published Unexamined Patent Application Nos. Hei 6-290007 and Hei 6-344639.

Japanese Published Unexamined Patent Application No. Hei 6-290007 discloses a print processor which measures the time required to rasterize first-format intermediate data into raster data per band. If the expansion is not finished in time for a specific band, the expansion of first-format intermediate data into raster data is followed by lossless compression of the data, the result being stored as second-format intermediate data. However, the presence of second-format intermediate data runs counter to the initial purpose of the band memory technique, i.e., it can lead to a larger memory for storing the intermediate data. Thus whenever a predetermined capacity of the intermediate data memory is exceeded, the second-format intermediate data are again rasterized into raster data. The rasterizing process is followed by lossy compression of the data at a high compression rate. The result is stored as third-format intermediate data. That is, the print processor described in Japanese Published Unexamined Patent Application No. Hei 6-290007 allows a page printer to output all pages even where print data include instructions for drawing complicated graphics or images, with a price paid for a worsened image quality due to the lossy compression at high compression rate. Furthermore, additional processes are needed to implement a plurality of intermediate data formats for the data to be accommodated in suitable memories. This can prolong the processing time of the entire print operation.

Japanese Published Unexamined Patent Application No. Hei 6-344639 discloses a print processor which causes a host computer to transfer input data to a page printer while measuring the transfer speed of the input data. On the basis of the input data transfer speed thus measured, the disclosed print processor controls the print speed of the page printer so as to avert situations where the expansion of the target data into raster data is not finished in time. Specifically, if the input data transfer speed is high, the printing speed of the page printer is increased correspondingly; the lower the input data transfer speed, the lower the printing speed of the page printer. However, the data to be input to the page printer can only be handled in a format in which the number of input data items is proportional to the number of output data items (the disclosed embodiment assumes input data to be composed of font data and raster data alone). Thus the print processor disclosed by Japanese Published Unexamined Patent Application No. Hei 6-344639 is incapable of handling print data containing instructions in description language for drawing complicated graphics.

SUMMARY OF THE INVENTION

It is therefore an object of the present invention to provide a print processor capable of optimally processing print data in accordance with the complexity of the data without deteriorating image quality, the target data illustratively including instructions in description language for drawing complicated graphics.

In carrying out the invention and according to a first aspect thereof, there is provided a print processor comprising: input means for inputting print data including at least either texts or graphics and described in predetermined drawing instructions; image output means for outputting images based on data having a predetermined data structure; intermediate data generating means for generating intermediate data from the print data, the intermediate data being expressed in a format which is higher in abstract terms than the data structure and which includes at least one basic graphic; rasterizing process means for rasterizing the intermediate data into the data structure and for supplying the image output means with the intermediate data thus rasterized; determining means for determining a number and a size of the basic graphics constituting the intermediate data generated by the intermediate data generating means; rasterizing time predicting means for predicting the time it takes the rasterizing process means to rasterize the intermediate data on the basis of the number and the size of the basic graphics determined by the determining means; and control means for determining an image output speed of the image output means in accordance with the time predicted by the rasterizing time predicting means.

In a preferred structure according to the invention, the intermediate data may be made of the print data expressed by a plurality of vector data per basic graphic and by composite attributes for composing the vector data.

In another preferred structure according to the invention, the vector data may include a height of the basic graphics as the size thereof.

In a further preferred structure according to the invention, the vector data may include a height and an area of the basic graphics as the size thereof.

In an even further preferred structure according to the invention, the rasterizing time predicting means may have predetermined coefficients of correspondence between vector data values of the basic graphics on the one hand and the time it takes the rasterizing process means to rasterize the intermediate data on the other hand.

In a still further preferred structure according to the invention, the coefficients of correspondence may be determined beforehand in accordance with the format in which the rasterizing process means rasterizes the intermediate data.

According to a second aspect of the invention, there is provided a print processor comprising: input means for inputting print data including at least either texts or graphics and described in predetermined drawing instructions; image output means for outputting images based on data having a predetermined data structure; intermediate data generating means for generating intermediate data from the print data, the intermediate data being expressed in a format which is higher in abstract terms than the data structure and which includes at least one basic graphic; rasterizing process means for rasterizing the intermediate data into the data structure and for supplying the image output means with the intermediate data thus rasterized; first predicting means for predicting the time it takes the intermediate data generating means to generate the intermediate data and the time it takes the rasterizing process means to rasterize the intermediate data; first control means for determining an image output speed of the image output means and a time at which the image output means is started, in accordance with the time predicted by the rasterizing time predicting means; determining means for determining a number and a size of the basic graphics constituting the intermediate data generated by the intermediate data generating means; second predicting means for predicting the time it takes the rasterizing process means to rasterize the intermediate data on the basis of the number and the size of the basic graphics determined by the determining means; and second control means for changing that image output speed of the image output means which is determined by the first control means, in accordance with the time predicted by the second predicting means.

In a preferred structure according to the second aspect of the invention, the first predicting means may include: classifying means for classifying the print data into groups in accordance with one of two criteria, one criterion being either a type or an attribute of the drawing instructions, the other criterion being a combination of a type and an attribute of the drawing instructions; and counting means for counting the number of the drawing instructions included in each of the groups classified by the classifying means; wherein the first predicting means may predict the time it takes the intermediate data generating means to generate the intermediate data and the time it takes the rasterizing process means to rasterize the intermediate data, on the basis of the number of sad drawing instructions counted by the counting means.

In another preferred structure according to the second aspect of the invention, the second control means may lower the image output speed determined by the first control means if the predicted rasterizing time is not in accord with the image output speed determined by the first control means for the image output means.

According to a third aspect of the invention, there is provided a print processor comprising: input means for inputting print data including at least either texts or graphics and described in predetermined drawing instructions; image output means for outputting images based on data having a predetermined data structure; intermediate data generating means for generating intermediate data from the print data, the intermediate data being expressed in a format which is higher in abstract terms than the data structure; rasterizing process means for rasterizing the intermediate data into the data structure and for supplying the image output means with the intermediate data thus rasterized; determining means for determining a number and a size of basic graphics constituting the intermediate data generated by the intermediate data generating means; rasterizing time predicting means for predicting the time it takes the rasterizing process means to rasterize the intermediate data on the basis of the number and the size of the basic graphics determined by the determining means; and control means for determining an image output speed of the image output means in accordance with the time predicted by the rasterizing time predicting means.

In a preferred structure according to the third aspect of the invention, the intermediate data generating means may comprise: vector data generating means for generating a plurality of vector data from the print data; and data generating means for expressing the print data using the plurality of vector data generated by the vector data generating means.

According to a fourth aspect of the invention, there is provided a print processor comprising: input means for inputting print data including at least either texts or graphics and described in predetermined drawing instructions; image output means; drawing object generating means for generating from the print data drawing object data representing drawing regions on the basis of a type and an attribute of the drawing instructions; drawing process means for rasterizing the drawing object data generated by the drawing object generating means into a data structure suitable for output through the image output means; region forming means for dividing the drawing object data generated by the drawing object generating means into a plurality of regions within a page; drawing time predicting means for predicting the time it takes to draw each of the plurality of regions at least on the basis of the total sum of predicted times required to draw the drawing object data included in the respective regions; and control means for determining an image output speed of the image output means in accordance with the drawing time predicted by the drawing time predicting means regarding each of the plurality of regions.

In a preferred structure according to the fourth aspect of the invention, the drawing time predicting means may predict the drawing time by adding a processing time of the drawing object generating means, a processing time of the region forming means, and the drawing times summed up for each of the plurality of regions regarding the drawing object data.

In another preferred structure according to the invention, the drawing object data may be constituted at least by vector data representing a region to be drawn and by attribute information about that region.

In a further preferred structure according to the invention, the drawing time predicting means may have coefficients for acquiring the predicted drawing times about the drawing object data.

In an even further preferred structure according to the invention, the image output means may have a plurality of image output speeds, and the control means may control the image output means so as to determine one of the plurality of image output speeds for each page on the basis of the drawing time predicted by the drawing time predicting means.

In a still further preferred structure according to the invention, the drawing time predicting means may predict the time it takes to draw each of a plurality of bands formed by dividing a single page.

In a yet further preferred structure according to the invention, the drawing process means may draw each of a plurality of bands formed by dividing the drawing instructions of a single page.

In another preferred structure according to the invention, the drawing time predicting means may predict the time it takes to draw each of the plurality of bands, and the control means may determine an image output speed slower than the longest of the predicted drawing times regarding the plurality of bands in the single page.

In a further preferred structure according to the invention, the drawing process means may include: page rasterizing process means for rasterizing a single page of the drawing object data; specific region rasterizing process means for dealing with a specific region constituted by data rasterized by the page rasterizing process means, the specific region rasterizing process means further rasterizing the data constituting the specific region into a data structure suitable for output through the image output means; and different region rasterizing process means for dealing with a region different from the specific region constituted by the data rasterized by the specific region rasterizing process means, the different region rasterizing process means further rasterizing data constituting the different region into the data structure suitable for output through the image output means.

In an even further preferred structure according to the invention, the single page may be constituted by a plurality of specific regions including the specific region as well as by a plurality of different regions.

These and other objects, features and advantages of the invention will become more apparent upon a reading of the following description and appended drawings.

BRIEF DESCRIPTION OF THE DRAWINGS

FIGS. 8A and 8B are schematic views explaining how trapezoid data are illustratively expressed;

DESCRIPTION OF THE PREFERRED EMBODIMENTS

Preferred embodiments of the invention will now be described with reference to the accompanying drawings.

First Embodiment

Figure 1:
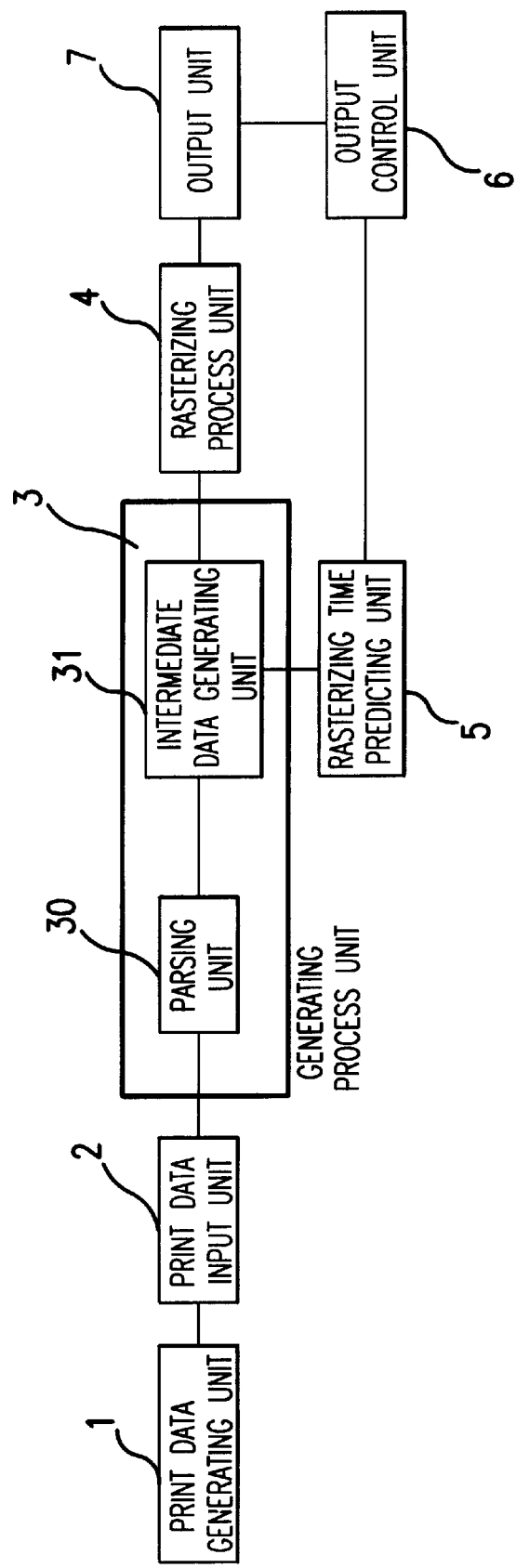
FIG. 1 is a block diagram of a print processor practiced as a first embodiment of the invention.

FIG. 1 is a block diagram of a print processor practiced as the first embodiment of the invention. In FIG. 1, the print processor comprises a print data generating unit 1, a print data input unit 2, a generating process unit 3, an rasterizing process unit 4, an rasterizing time predicting unit 5, an output control unit 6, and an output unit 7. The generating process unit 3 includes a parsing unit 30 and an intermediate data generating unit 31.

The print data generating unit 1 has functions to generate print data in description language from document or text data prepared by application programs (for document creation ,word processing and/or editing) on a personal computer or a workstation. The description language handled by the first embodiment is illustratively GDI. Alternatively, PDF (Portable Document Format) represented by Acrobat or a page description language such as PostScript may be used instead.

The print data input unit 2 has communication functions to input print data generated by the print data generating unit 1, or has storage functions to accommodate print data temporarily before output to the generating process unit 3.

The generating process unit 3, including the parsing unit 30 and intermediate data generating unit 31, generates intermediate data from the print data coming from the print data input unit 2. The intermediate data thus generated are fed to the rasterizing process unit 4 to be rasterized thereby into print-out data.

The parsing unit 30 extracts "tokens," according to the syntax of the predetermined description language, from the print data coming from the print data input unit 2. The tokens are output to the intermediate data generating unit 31.

Given the tokens from the parsing unit 30, the intermediate data generating unit 31 interprets the received tokens, executes drawing instructions based on the interpreted tokens, generates data in increments of trapezoids corresponding to the drawing instructions, and manages and stores the trapezoid data as intermediate data with respect to each band. The intermediate data are read out and sent to the rasterizing process unit 4 and rasterizing time predicting unit 5 as needed. The purpose of generating intermediate data is twofold: to permit high-speed expansion by the rasterizing process unit 4, and to simplify the prediction by the rasterizing time predicting unit 5. For that purpose, the intermediate data are expressed as a set of simple graphics (typically trapezoids) and classified for each of the bands involved. The link between the intermediate data generating unit 31 and the rasterizing process unit 4 is implemented in the form of real-time data transmission which guarantees transmission bands. For real-time data transmission, an isochronous transmission mode of the IEEE1394 high-performance serial bus is illustratively used.

The rasterizing process unit 4 reads intermediate data from the generating process unit 3 in units each corresponding to a single band, and generates print-out data in band buffer memories (422 and 423 in FIG. 10) inside the rasterizing process unit 4. The process causes print-out data to be accumulated alternately in the two band buffer memories within the rasterizing process unit 4. As will be described later, the output unit 7 for use with the first embodiment is a color page printer. The print-out data accumulated alternately in the buffer memories correspond to recording color print data printed by the output unit 7. Subsequently the print-out data held in the band buffer memories are output alternately therefrom to the output unit 7 as demanded by the latter.

The rasterizing time predicting unit 5 reads out the intermediate data prepared by the generating process unit 3 and, based on the type of the data and on the area of each of the trapezoids involved, predicts the rasterizing time for each band through weighted additions. The predicted rasterizing times per band are output to the output control unit 6.

The output control unit 6 controls the start timings and recording speeds of the output unit 7. More specifically, on the basis of the predicted band-wise rasterizing times received in increments of pages from the rasterizing time predicting unit 5, the output control unit 6 controls the recording speed of the output unit 7 so that the output of the latter unit will not exceed the predicted rasterizing time per band.

Under control of the output control unit 6, the output unit 7 receives the print-out data from the band buffer memories in the rasterizing process unit 4 and prints the received data onto recording paper. More specifically, the output unit 7 is a color page printer operating on the principle of laser-scan xerography and capable of outputting full color images by repeating exposure, developing and transfer for each of four colors C (cyan), M (magenta), Y (yellow) and Bk (black).

Figure 2:
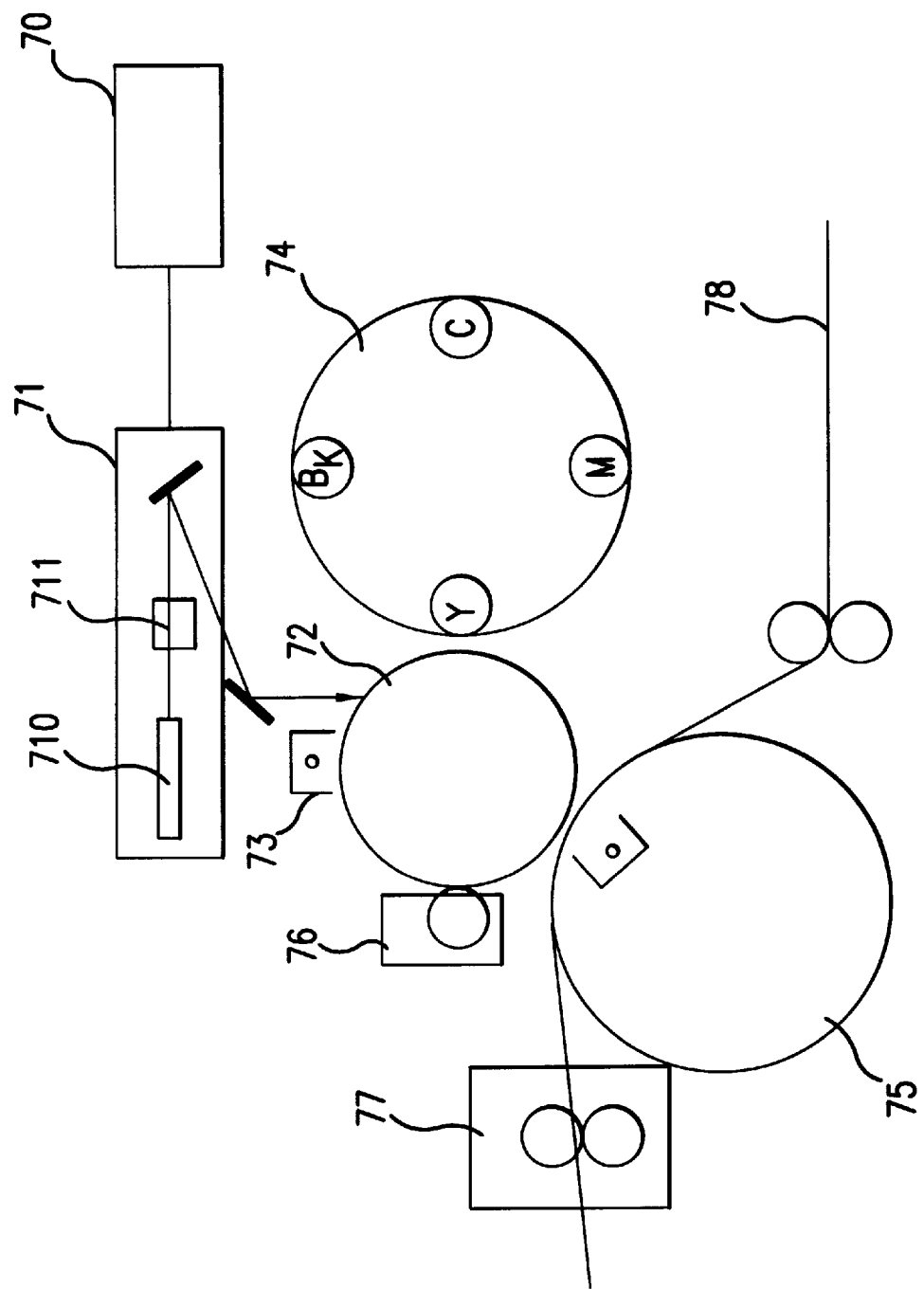
FIG. 2 is an explanatory view of a color page printer.

Described below with reference to FIG. 2 is how a common color page printer utilizing laser-scan xerography is structured and how it typically works. In FIG. 2, a video interface 70 receives print data corresponding to the color information of C, M, Y and Bk sent successively from the rasterizing process unit 4, and converts the received print data into optical signals by having the data input to a driver that controls the action of a semiconductor laser device, not shown. A semiconductor laser scanner 71 comprises an infrared semiconductor laser, a lens 711 and a polygon mirror 710. The scanner 71 emits a laser beam to scan a photosensitive drum 72, the spot of the beam being on the order of tens of micrometers in diameter. The photosensitive drum 72, electrically charged beforehand by a charging unit 73, has an electrostatic latent image formed thereon by the optical signals. The latent image is turned into a toner image by the so-called dual-component magnetic brush phenomenon over a rotary developing unit 74. The toner image is transferred to a sheet of paper wound around a transfer drum 75. The paper is transported along a path 78. Excess toner is cleaned off the photosensitive drum by a cleaner 76. The process above is repeated for each of the colors Y, M, C and Bk to effect multiple image transfers onto the sheet of paper. At the end of the process, the paper is peeled off the transfer drum and the toner on the sheet is fused by a fusing unit 77.

The flow of print data in the print processor of the above constitution is summarized as follows: the print data generated by the print data generating unit 1 are forwarded via the print data input unit 2 to the parsing unit 30 of the generating process unit 3. The parsing unit 30 extracts tokens from the received print data and sends the tokens to the intermediate data generating unit 31. The intermediate data generating unit 31 generates intermediate data from the tokens and sends the data to the rasterizing time predicting unit 5 and rasterizing process unit 4. Upon receipt of the intermediate data, the rasterizing time predicting unit 5 predicts the rasterizing time for each band through weighted additions based on the type of the intermediate data and on the area of each of the trapezoids involved. The predicted rasterizing times per band are added up in increments of pages and output to the output control unit 6. On the basis of the rasterizing times predicted by the rasterizing time predicting unit 5 for the respective bands, the output control unit 6 determines the recording speed of the output unit 7, activates the output unit 7, and runs the unit 7 at the recording speed thus determined.

Meanwhile, the rasterizing process unit 4 receives the intermediate data and rasterizes the received data until a band buffer memory of the unit 4 is filled with print-out data first to be recorded by the output unit 7. When a cycle-up operation of the output unit 7 is completed, the print-out data are transferred in increments of lines from the band buffer memory to the output unit 7 for printing in accordance with the recording speed of the latter. While the print-out data from one band buffer memory are being printed, the other band buffer memory is being supplied with rasterized print-out data until the memory is full. The expansion into print-out data by the rasterizing process unit 4 and the printing by the output unit 7 are repeated for each of the colors used until the print data of a single page have been exhausted. If the print data are made up of a plurality of pages, the above operations are repeated until the output of all pages has come to an end.

The print processor practiced as the first embodiment has been outlined above. What follows is a detailed description of key components of this print processor.

First to be described is the intermediate data generating unit 31.

Figure 3:
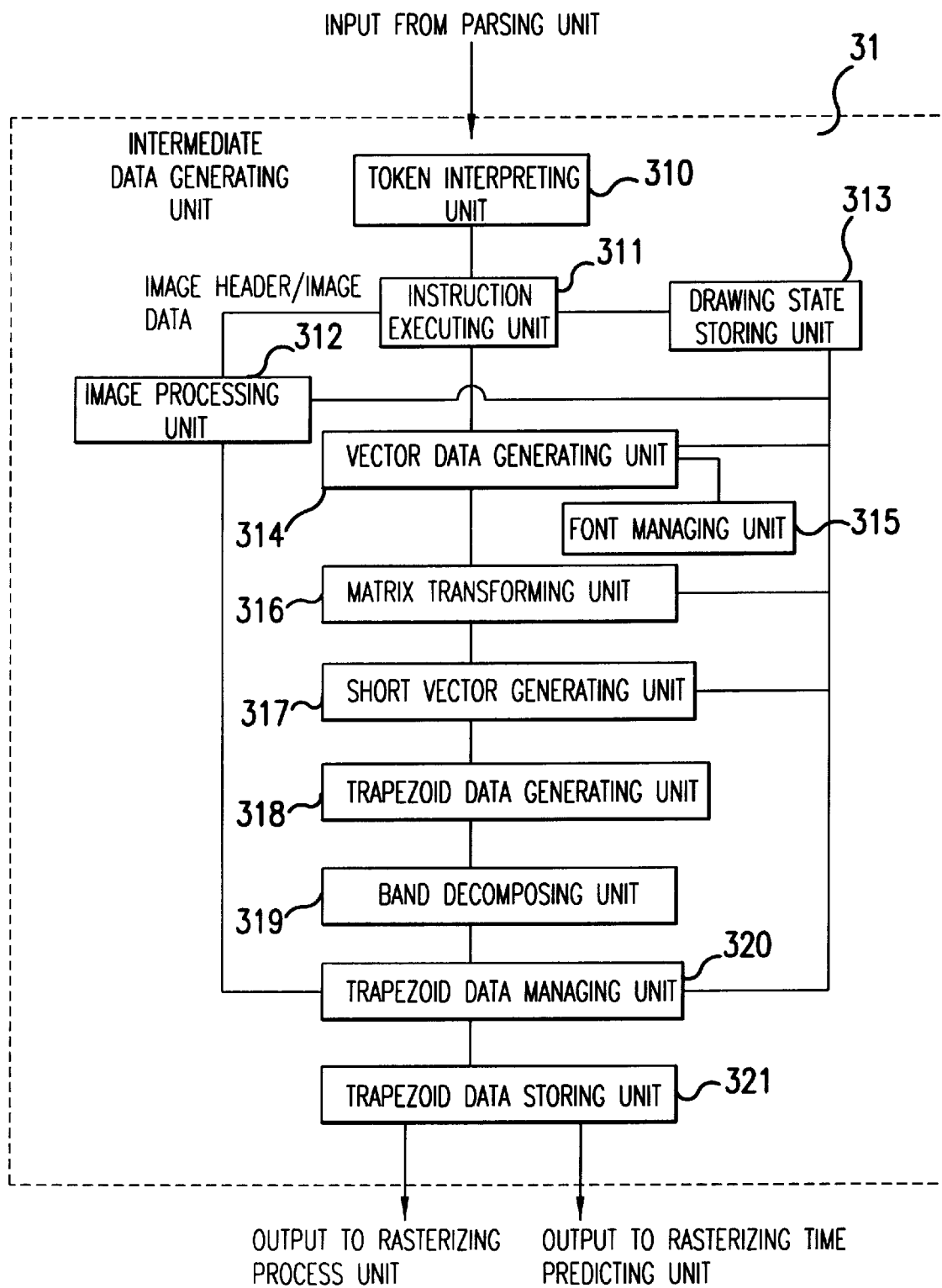
FIG. 3 is a block diagram of an intermediate data generating unit.

As depicted in FIG. 3, the intermediate data generating unit 31 comprises a token interpreting unit 310, an instruction executing unit 311, an image processing unit 312, a drawing state storing unit 313, a vector data generating unit 314, a font managing unit 315, a matrix transforming unit 316, a short vector generating unit 317, a trapezoid data generating unit 318, a band separating unit 319, a trapezoid data managing unit 320, and a trapezoid data storing unit 321.

The token interpreting unit 310 interprets tokens received from the parsing unit 30 and transforms the received tokens into internal instructions which are sent to the instruction executing unit 311. The instruction executing unit 311 transfers each instruction to the image processing unit 312, to the drawing state storing unit 313 or to the vector data generating unit 314 depending on the type of the instruction in question. The image processing unit 312 performs varieties of image processing based on image headers and image data received so as to generate output image headers and output image data. The output image headers and output image data thus generated are transferred to the trapezoid data managing unit 320. The drawing state storing unit 313 stores drawing-related information furnished by the instructions from the instruction executing unit 311. The vector data generating unit 314 generates vector data to be drawn through the use of the instructions and their attached information from the instruction executing unit 311, of the information from the drawing state storing unit 313, and of the information from the font managing unit 315. The vector data thus generated are transferred to the matrix transforming unit 316. The font managing unit 315 stores and manages outline data about various fonts and provides text outline data as demanded. The matrix transforming unit 316 subjects the vector data from the vector data generating unit 314 to affine transformation using transformation matrices of the drawing state storing unit 313. The transformed data are transferred to the short vector generating unit 317. The short vector generating unit 317 approximates the vector of the input curve using a set of linear vectors called short vectors, and sends the short vectors to the trapezoid data generating unit 318. Given the short vectors, the trapezoid data generating unit 318 generates trapezoid data to be drawn and transfers the generated data to the band separating unit 319. Of the trapezoid data thus received, those spanning a plurality of bands are divided into trapezoid data for each band. The divided trapezoid data are sent to the trapezoid data managing unit 320 in units each representing a single band. The trapezoid data managing unit 320 supplements the received band-wise trapezoid data by management information as well as by color information sent from the drawing state storing unit 313 and image processing unit 312. The trapezoid data thus supplemented are written as intermediate data to the trapezoid data storing unit 321. The trapezoid data storing unit 321 stores the intermediate data from the trapezoid data managing unit 320 in units each representing a single band. The intermediate data thus stored are transferred to the rasterizing process unit 4 or rasterizing time predicting unit 5 as demanded thereby. The process ranging from the interpretation by the token interpreting unit 310 to the writing to the trapezoid data storing unit 321 is repeated every time a drawing instruction is input. The transfer of intermediate data from the trapezoid data storing unit 321 to the rasterizing process unit 4 and to the rasterizing time predicting unit 5 takes place after one page of intermediate data has been stored.

How the components of the intermediate data generating unit 31 work will now be described in connection with specific data structures.

The token interpreting unit 310 interprets the tokens coming from the parsing unit 30, transforms the tokens into internal instructions and their arguments, and transfers a set of these internal instructions and arguments to the instruction executing unit 311. The internal instructions illustratively include drawing instructions for drawing text, graphics and images, as well as drawing state instructions for setting colors, line attributes and other information necessary for drawing.

The instruction executing unit 311 executes the instructions sent from the token interpreting unit 310. The instructions executed by the instruction executing unit 311 are constituted primarily by drawing instructions and drawing state instructions. As shown in Table 1 below, there are typically three drawing instructions each designating information necessary for drawing. Of the items of information listed in Table 1, those underlined are given as arguments of the drawing instruction in question. The other items of information are placed initially or by the preceding instruction into the drawing state storing unit 313. Upon instruction execution, all drawing instructions except for an image drawing instruction are forwarded unchanged to the vector data generating unit 314. The image drawing instruction, when received, is transferred to the image processing unit 312 with the length and width of an image header transferred to the vector data generating unit 314. Drawing state instructions are transferred to the drawing state storing unit 313.

TABLE 1

Types of Drawing Instructions and Information Necessary for Drawing

| | | Information Necessary for Drawing |
|---|---|---|
| Text drawing instruction | For drawing texts | Text code, font ID, coordinate transformation matrix, current point, drawing color |
| Image drawing instruction | For drawing images | Source image data, source image header (length, width, depth, color space of source data), coordinate transformation matrix, current point |
| Graphic drawing instruction | For region-fills | vector data (straight line, curve), flatness, coordinate transformation matrix, drawing color |
| | For strokes | vector data (straight line, curve), line attributes (line width, line cap, line join, miter limit, dash), flatness, coordinate transformation matrix, drawing color |

The image processing unit 312 may subject the input image header and input image data, i.e., instruction arguments received from the instruction executing unit 311, to affine transformation using the transformation matrix acquired from the drawing state storing unit 313. The image processing unit 312 may also subject the input image header and input image data to color space transformation whereby the color space of the input image is transformed into a color space of the output unit. The output image header and output image data thus prepared are transferred to the trapezoid data managing unit 320.

The drawing state storing unit 313 sets and stores illustratively the values of those arguments which are contained in the instructions received from the instruction executing unit 311 and which are not underlined in Table 1. The values are transferred as requested by the image processing unit 312, vector data generating unit 314, matrix transforming unit 316, short vector generating unit 317, and trapezoid data managing unit 320.

Figure 4:
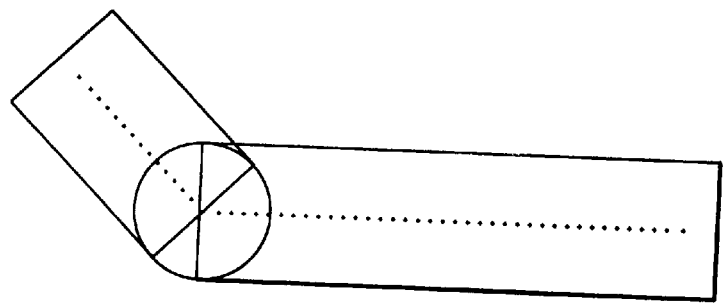
FIG. 4 is a schematic view explaining an outline vector.

Using the instructions and arguments from the instruction executing unit 311 as well as values from the drawing state storing unit 313, the vector data generating unit 314 generates vector data to be drawn anew with the exception of region-fill. For texts to be drawn, the text codes given by arguments and the font ID acquired from the drawing state storing unit 313 are first transferred to the font managing unit 315 which in turn yields text outline data. Because the outline data thus obtained do not include information about an origin of drawing (current point), an offset of the current point acquired from the drawing state storing unit 313 is added to the outline data, whereby the target vector data are generated. For an image to be drawn, a rectangular vector is first generated from the length and width of the image header supplied by the arguments. The vector is supplemented by an offset of the current point obtained from the drawing state storing unit 313, whereby the target vector data are generated. For strokes to be drawn, the vector furnished by arguments and various line attributes acquired from the drawing state storing unit 313 are used as the basis for generating an outline vector whose line is as thick as shown in FIG. 4. The vector thus generated (or a vector received directly from the instruction executing unit 311 in the case of reigion-fill) is transferred to the matrix transforming unit 316.

The font managing unit 315 stores outline vector data about various fonts. Given a text code and a font ID, the font managing unit 315 offers outline vector data about the text in question.

The matrix transforming unit 316 subjects the vector data from the vector data generating unit 314 to affine transformation using the transformation matrix obtained from the drawing state storing unit 313. The primary objective of affine transformation is to transform the resolution (coordinate system) of an application to a printer resolution (another coordinate system). The transformation matrix is a 3×3 type, given in the form of expression (1) shown below. The input vector data (Xn, Yn) are transformed into output vector data (Yn', Yn') before being sent to the short vector generating unit 317.

$$(Xn', Yn') = (Xn, Yn) \begin{pmatrix} a & b & 0 \\ c & d & 0 \\ e & f & 1 \end{pmatrix} \quad (1)$$

Figure 5:
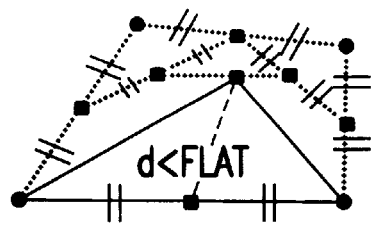
FIG. 5 is an explanatory view of recurrent division of a Bezier curve.

Using a plurality of short vectors, the short vector generating unit 317 approximates a vector of a curve that may be included in the input vector so that the error of the approximated vector will become smaller than the value of flatness obtained from the drawing state storing unit 313. Illustratively, a Bezier curve expressed by four control points in FIG. 4 may be used as the curve vector. The Bezier curve is recurrently divided into short vectors as shown in FIG. 5. The dividing operation is terminated when the height (distance "d") becomes smaller than the value given as flatness. After the division, the start and end points of each of the Bezier curve segments are connected to one another, which completes the division into short vectors. The short vectors thus generated are sent to the trapezoid data generating unit 318.

Figure 6B:
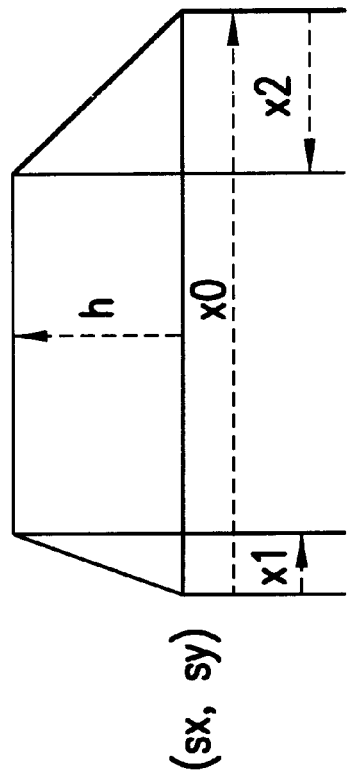
FIGS. 6A and 6B are schematic views explaining trapezoid data.
Figure 6A:
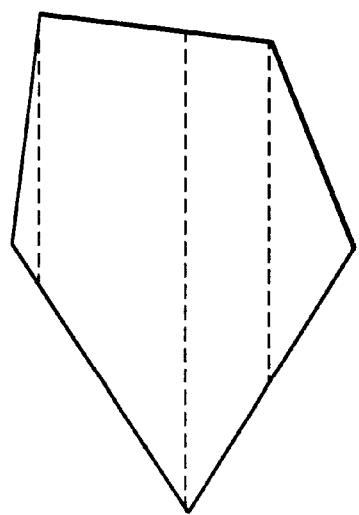

The trapezoid data generating unit 318 generates from the input vector data a set of trapezoid data (triangles may occur but the data structure remains the same as with trapezoids) delimiting a drawing region. For example, polygon vectors shown by thick line in FIG. 6A comprise four trapezoids defining a drawing region. The trapezoids each have two sides paralleling the scan line of the output unit. One trapezoid, as shown in FIG. 6B, is expressed by six data items (sx, sy, x0, x1, x2, h) The generated trapezoids are sent to the band separating unit 319.

Figure 7:
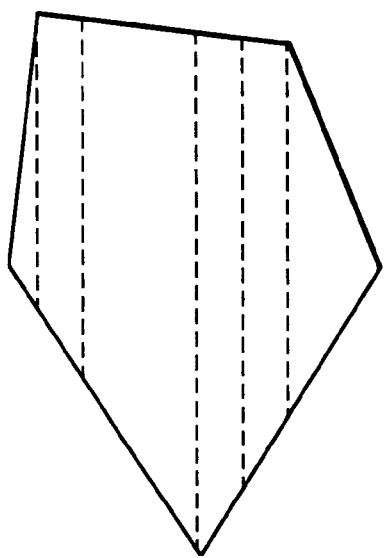
FIG. 7 is an explanatory view of trapezoid data being divided along band boundaries.
Figure 7:
Figure 7:
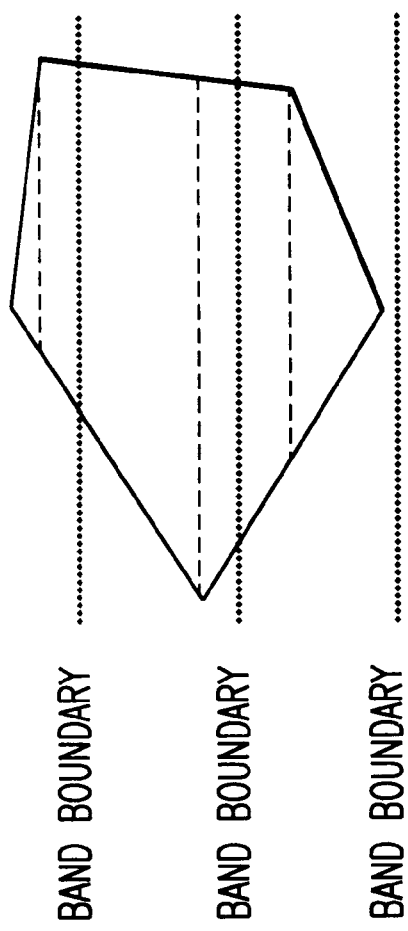

Of the input trapezoid data items, those spanning a plurality of bands are divided by the band decomposing unit 319 into trapezoid data for each band. The trapezoid data per band are transferred to the trapezoid data managing unit 320. Illustratively in FIG. 7, data representing four trapezoids are divided by the band separating unit 319 into data denoting six trapezoids.

Figure 9A:
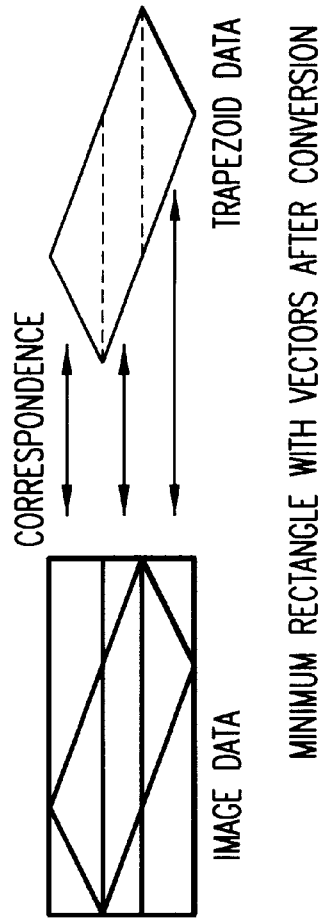
FIGS. 9A and 9B are schematic views explaining how image data and trapezoid data correspond to one another.
Figure 9B:
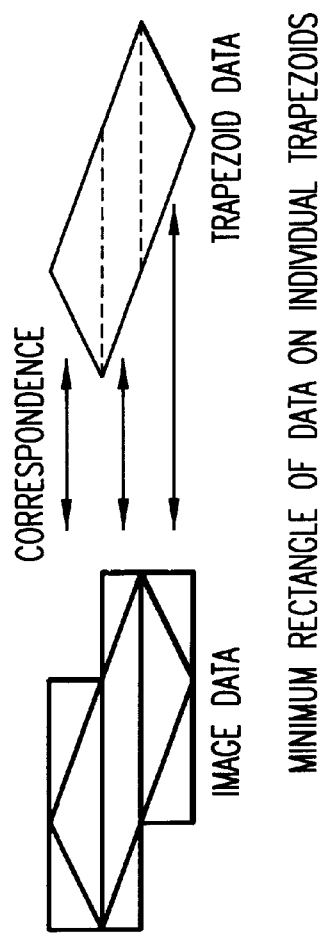

The trapezoid data managing unit 320 generates intermediate data by supplementing the band-wise input trapezoid data with additional information. Having thus generated the intermediate data, the trapezoid data managing unit 320 writes the data per band to the trapezoid data storing unit 321. The additional information is made up of management information for managing intermediate data and of color information designating the color in which to paint the trapezoid data. The management information about a text or graphic drawing instruction includes an object ID, an object type and a trapezoid count. The color information typically consists of values of C, M, Y and Bk. These data are added, as shown in FIG. 8A, before the trapezoid data per band generated by a drawing instruction. Whereas the management information for the image drawing instruction is the same as that for the text and graphic drawing instructions, the color information for the image drawing instruction comprises an image header and image data. As depicted in FIG. 8B, the data about each trapezoid per band generated by the drawing instruction are supplemented by one image header and one image data item. While the image header and image data are input from the image processing unit 312, the image data added as intermediate data may be one of two kinds: either image data about the smallest rectangle of the vector indicating the transformed image as shown in FIG. 9A, or image data about the smallest rectangle for each trapezoid as depicted in FIG. 9B. Because of their mass volume, the image data may be stored in compressed form. The trapezoid data above are grouped with respect to each of the bands involved. The last data for each band are terminated with an EOD (end of data) marker to designate the end of the band data.

The trapezoid data storing unit 321 stores for each band the intermediate data generated by the trapezoid data managing unit 320 in accordance with each drawing instruction. The intermediate data are transferred to the rasterizing process unit 4 or to the rasterizing time predicting unit 5 as demanded thereby. The trapezoid data generating unit 318 may alternatively generate other forms of intermediate data.

Illustratively, texts or graphics included in print data may be expressed in vectors; specific vectors among those corresponding to texts or graphics may be used as intermediate data representing the texts or graphics. Such specific vectors may be constituted by the longest and the shortest vectors corresponding to texts or graphics. Furthermore, all corresponding vectors may be used as intermediate data.

The rasterizing process unit 4 will now be described in detail.

Figure 10:
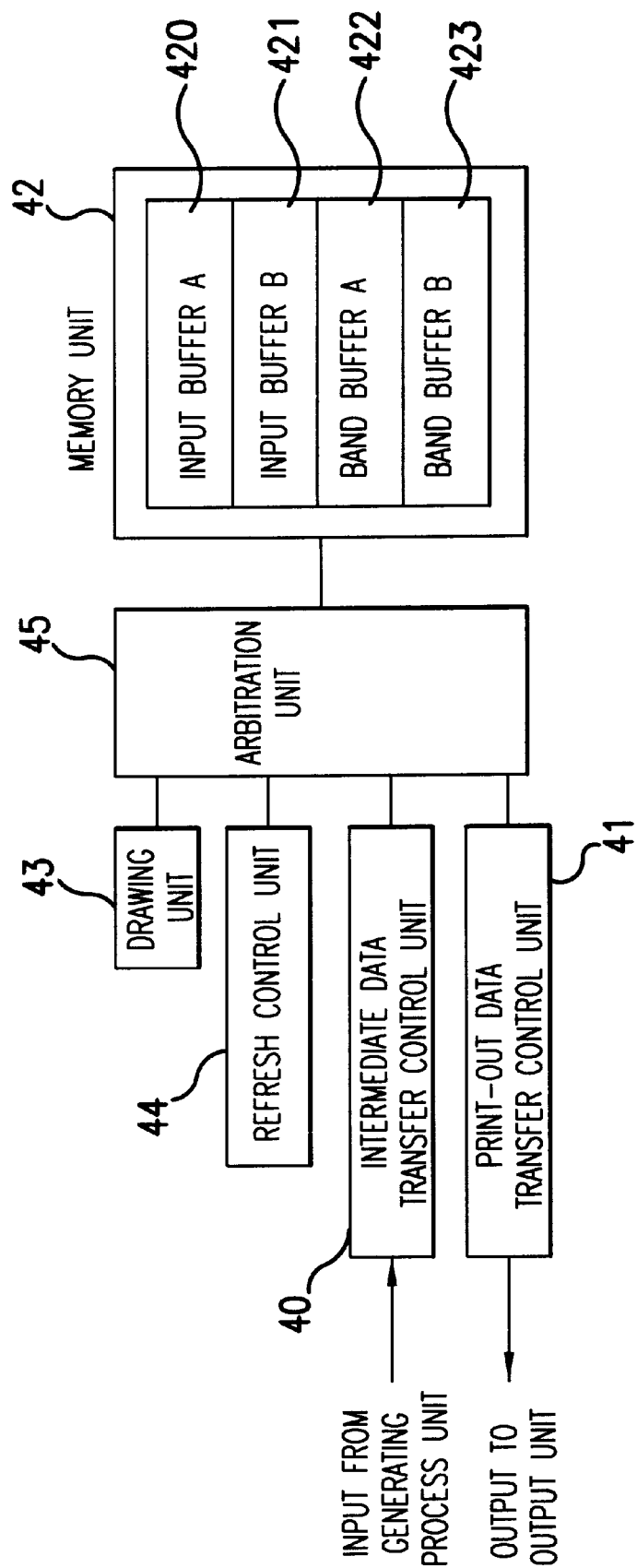
FIG. 10 is a block diagram of an rasterizing process unit.

FIG. 10 is a block diagram outlining a typical constitution of the rasterizing process unit 4. The band-wise intermediate data generated by the generating process unit 3 are read by an intermediate data transfer control unit 40 and written to an input buffer (A) 420 or (B) 421 in a memory unit 42. A drawing unit 43 reads the intermediate data from the input buffer (A) 420 or (B) 421, rasterizes the data, and writes the rasterized data to a band buffer (A) 422 or (B) 423. A print-out data transfer control unit 41 reads print-out data in rasterized form from the band buffer (A) 422 or (B) 423. As they are read in, the print-out data are serially converted and output to the output unit 7 in synchronism with a serial output clock signal. A refresh control unit 44 controls refresh operations of the memory unit 42 that comprises the input buffers (A) 420 and (B) 421 as well as the band buffers (A) 422 and (B) 423. An arbitration unit 45 arbitrates the drawing unit 43, refresh control unit 44, intermediate data transfer control unit 40 and print-out data transfer control unit 41 in their attempts to access the memory unit 42 in accordance with the access priority of each unit.

Figure 11A:
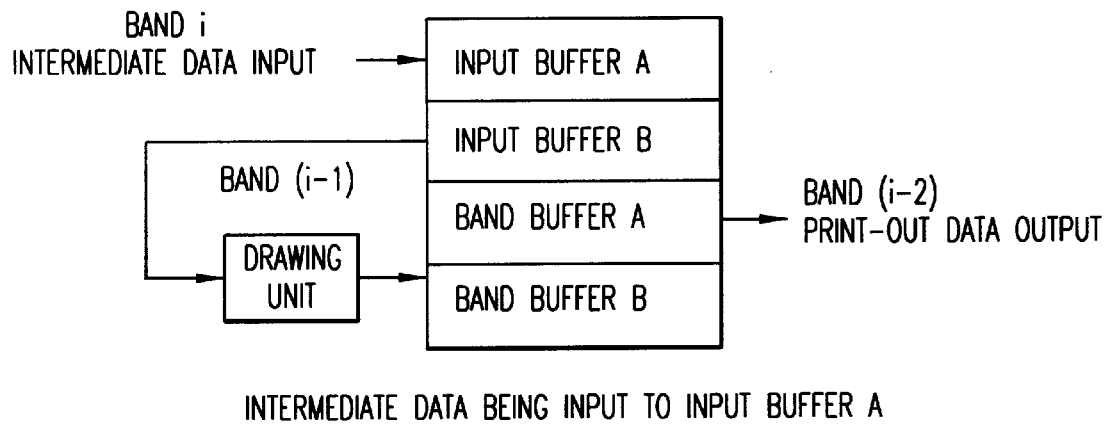
FIGS. 11A and 11B are schematic views explaining how input buffers and band buffers are used illustratively.
Figure 11B:
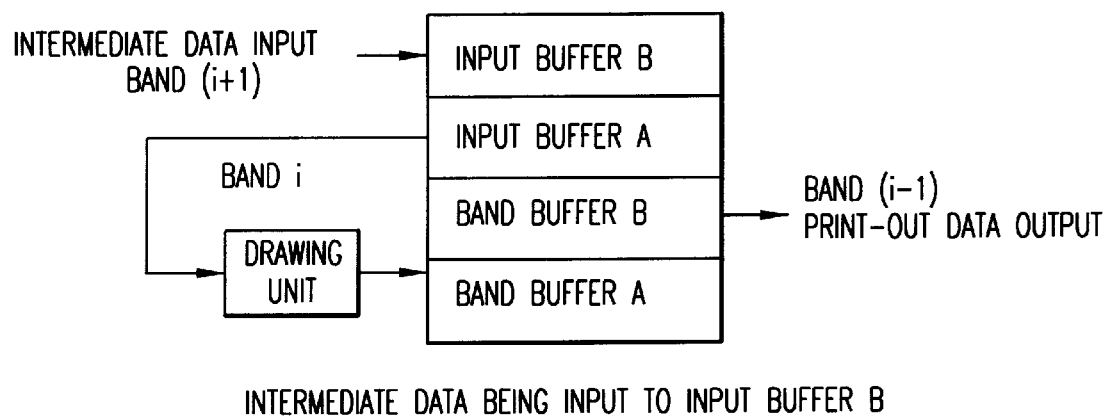

What follows is a description of how to use the input buffers 420 and 421 as well as the band buffers 422 and 423. FIG. 11A shows how each buffer is illustratively used with the input buffer (A) being fed with intermediate data, and FIG. 11B depicts typical usage of each buffer with the input buffer (B) currently supplied with intermediate data. In FIG. 11A, the intermediate data corresponding to a band "i" are being input to the input buffer (A), while the input buffer (B) has been supplied already with the intermediate data corresponding to a band (i−1). The drawing unit 43 reads the intermediate data from the input buffer (B), rasterizes the read-out data and writes the rasterized data to the band buffer (B). The band buffer (A) contains print-out data which, in end form, represent the intermediate data corresponding to a band (i−2). The print-out data transfer control unit 41 reads the rasterized print-out data from the band buffer (A) and sends the data to the output unit 7. In FIG. 11B, the intermediate data corresponding to a band (i+1) are currently input to the input buffer (B), with the input buffer (A) having been supplied already with the intermediate data corresponding to the band "i." The drawing unit 43 reads the intermediate data from the input buffer (A), rasterizes the read-out data and writes the rasterized data to the band buffer (A). The band buffer (B) contains print-out data which, in rasterized form, represent the intermediate data corresponding to the band (i−1). The print-out data transfer control unit 41 reads the rasterized print-out data from the band buffer (B) and forwards the data to the output unit 7.

Figure 12:
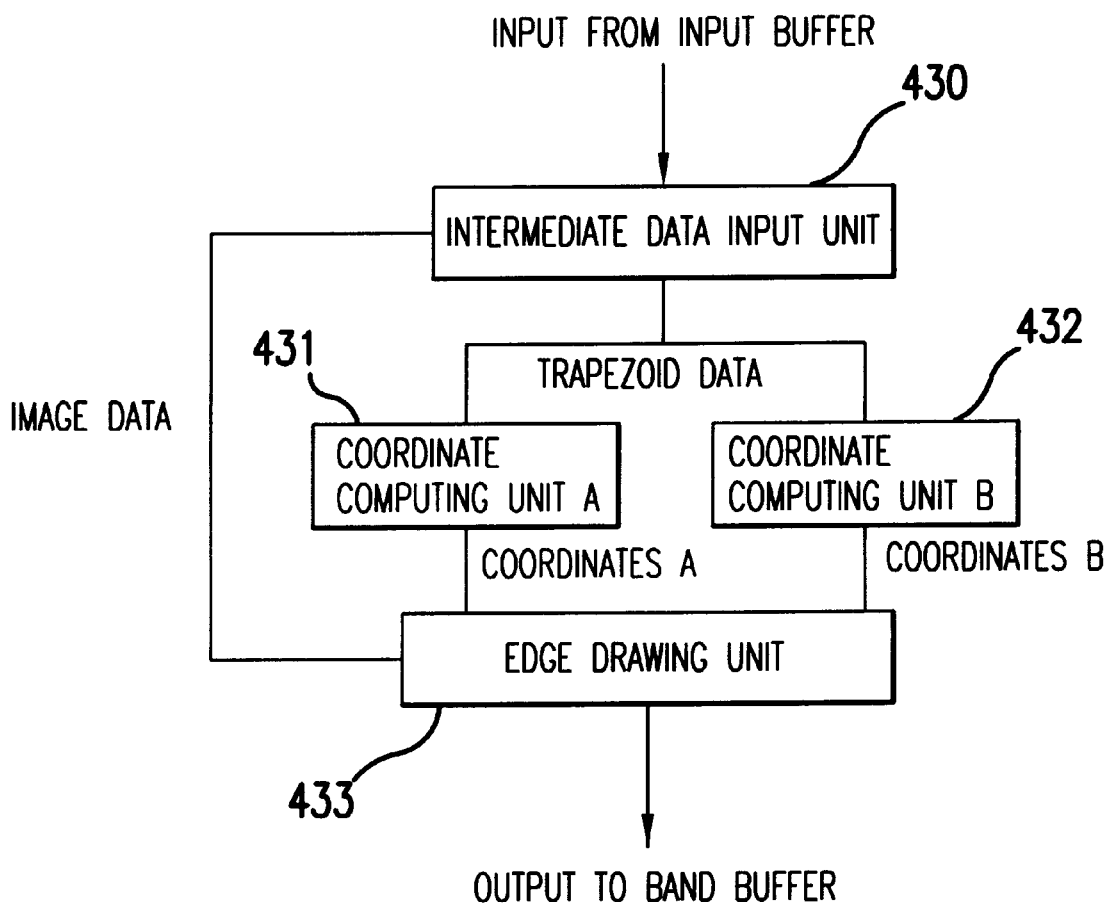
FIG. 12 is a block diagram of a drawing unit.
Figure 13:
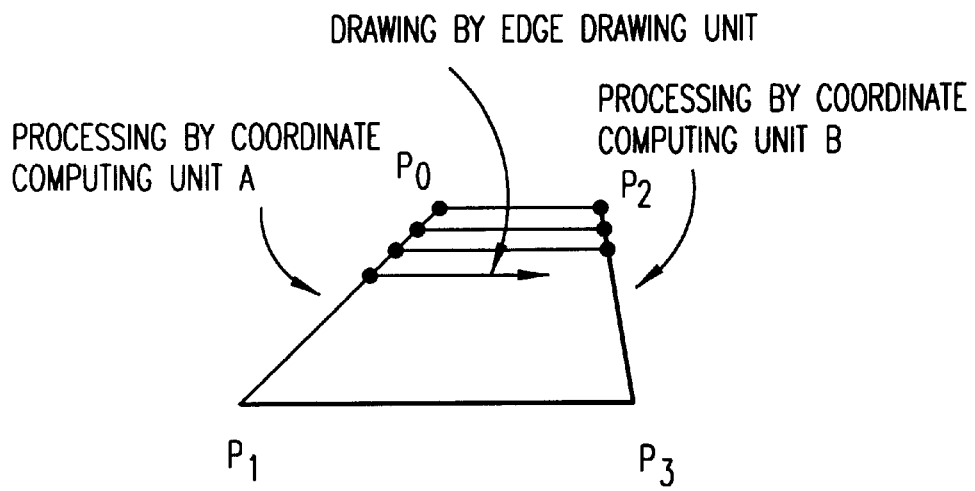
FIG. 13 is a schematic view explaining how the drawing unit illustratively draws trapezoid data.

Given the intermediate data representing trapezoid data (sx, sy, x0, x1, x2, h), the drawing unit 43 converts the data into a data format made of four points as shown in FIG. 13 in order to draw a trapezoid region. FIG. 12 is a block diagram showing a typical constitution of the drawing unit 43. An intermediate data input unit 430 reads data constituting one trapezoid at a time from the input buffer, and outputs trapezoid data to coordinate computing units (A) 431 and (B) 432. The coordinate computing unit (A) 431 computes coordinates on a left-hand edge (P0 through P1 in FIG. 13) of the trapezoid, and outputs the coordinates of points on the edge consecutively from P0 to P1. The coordinate computing unit (B) 432 computes coordinates on a right-hand edge (P2 through P3 in FIG. 13) of the trapezoid, and outputs the coordinates of points on the edge successively from P2 to P3. An edge drawing unit 433 draws straight lines in parallel with the X axis of the trapezoid by use of the coordinates received from the coordinate computing units (A) 431 and (B) 432.

Figure 14:
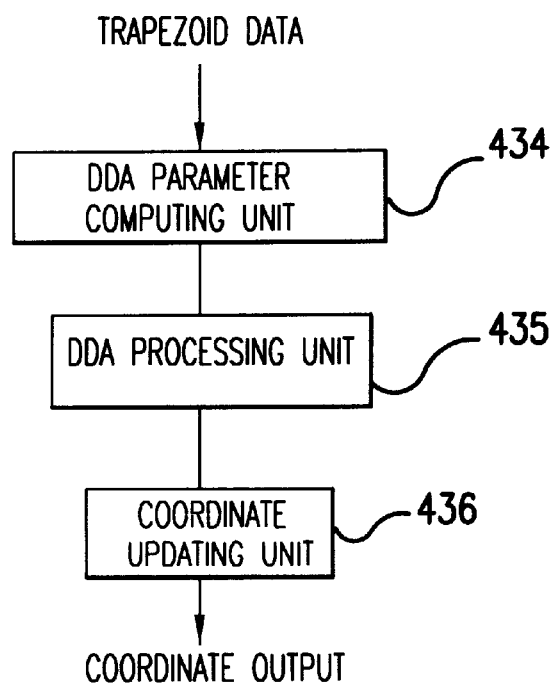
FIG. 14 is a block diagram of a coordinate computing unit.

FIG. 14 is a block diagram outlining a typical constitution of the coordinate computing unit. The input trapezoid data (sx, sy, x0, x1, x2, h) are converted by a DDA (digital differential analyzer) parameter computing unit 434 into four points of trapezoid data (P0, P1, P2, P3). After computing DDA parameters such as gradients and initial values of the residue, the DDA parameter computing unit 434 outputs the resulting parameters to a DDA processing unit 435. The DDA processing unit 435 performs DDA processing based on the input parameters, and outputs the direction and amount of movement relative to the point obtained at the end. A coordinate updating unit 436 updates currently stored coordinates in accordance with the input direction and amount of movement, and outputs the updated coordinates. The initial values of the coordinates are assumed to be established beforehand by a CPU or the like, not shown.

Figure 15:
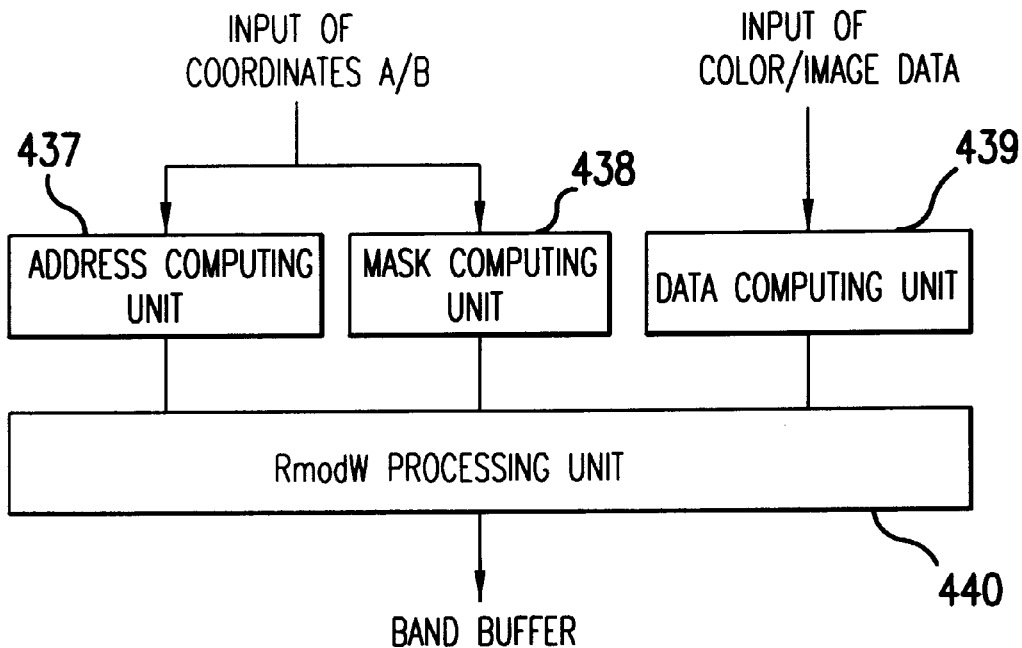
FIG. 15 is a block diagram of an edge drawing unit.

FIG. 15 is a block diagram indicating a typical constitution of the edge drawing unit 433. The edge drawing unit 433 receives coordinates A/B and image data and paints the internal region of a trapezoid accordingly. An address computing unit 437 receives the coordinates A/B and computes the address of the edge component to be drawn. A mask computing unit 438 receives the coordinates A/B and outputs a mask that expresses significant bits in each word to be drawn. A data computing unit 439, on receiving text or graphic data, acquires color data expressing fixed colors using a trapezoid region, performs screening with these data values, and outputs the result. If the received data are image data, the data computing unit 439 screens the image data input and outputs the result. An RmodW processing unit 440 permits drawing by carrying out the following operations using the input address, mask and data. Given the address, the process unit reads data from the band buffer. If the data read from the band buffer are regarded as a "Source," mask data as "Mask," and drawing data as "Data," then operations of (Mask*Data+Mask#+Source)

are performed and the result is written back to the same address. In the expression above, symbol "*" stands for an AND operation, "+" for an OR operation and "#" for a NOT operation. The operations are carried out repeatedly on each word containing an edge to be drawn.

The rasterizing time predicting unit 5 will now be described in detail.

Figure 16:
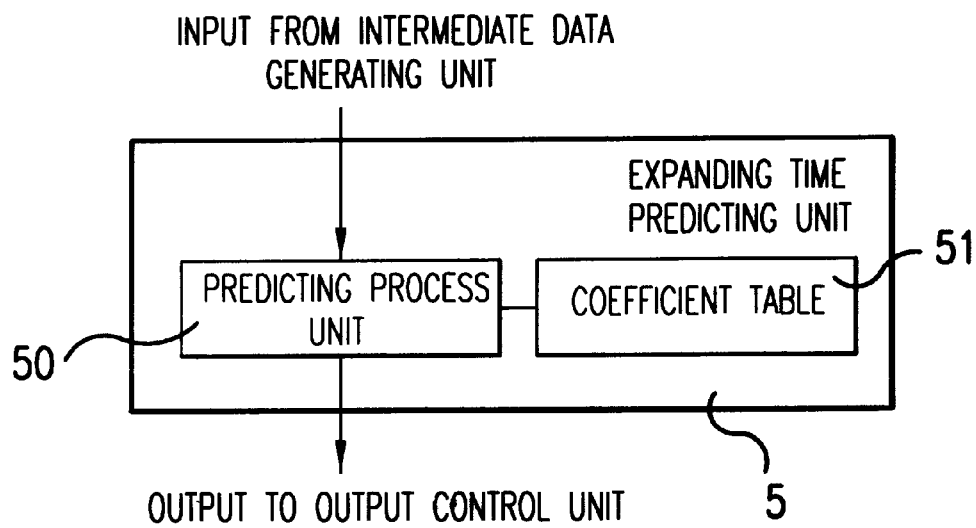
FIG. 16 is a block diagram of an rasterizing time predicting unit.

FIG. 16 is a block diagram outlining a typical constitution of the rasterizing time predicting unit 5 in the first embodiment. The rasterizing time predicting unit 5 comprises a predicting process unit 50 that receives an output of the intermediate data generating unit 31 and predicts an rasterizing time accordingly, and a coefficient table 5 that stores coefficients required by the predicting process unit 50.

The print data are converted by the intermediate data generating unit 31 into band-wise trapezoid data which are input to the predicting process unit 50 in increments of bands. The rasterizing time for each trapezoid is predicted and accumulated, whereby the rasterizing time per band is predicted. The predicted rasterizing times are sent to the output control unit 6 along with information about intermediate data volumes regarding the bands. How rasterizing times are predicted through computation will now be described in detail with reference to the flowchart of FIG. 17. It is assumed that the input trapezoid data are described by use of the data structure shown in FIG. 6B.

Figure 17:
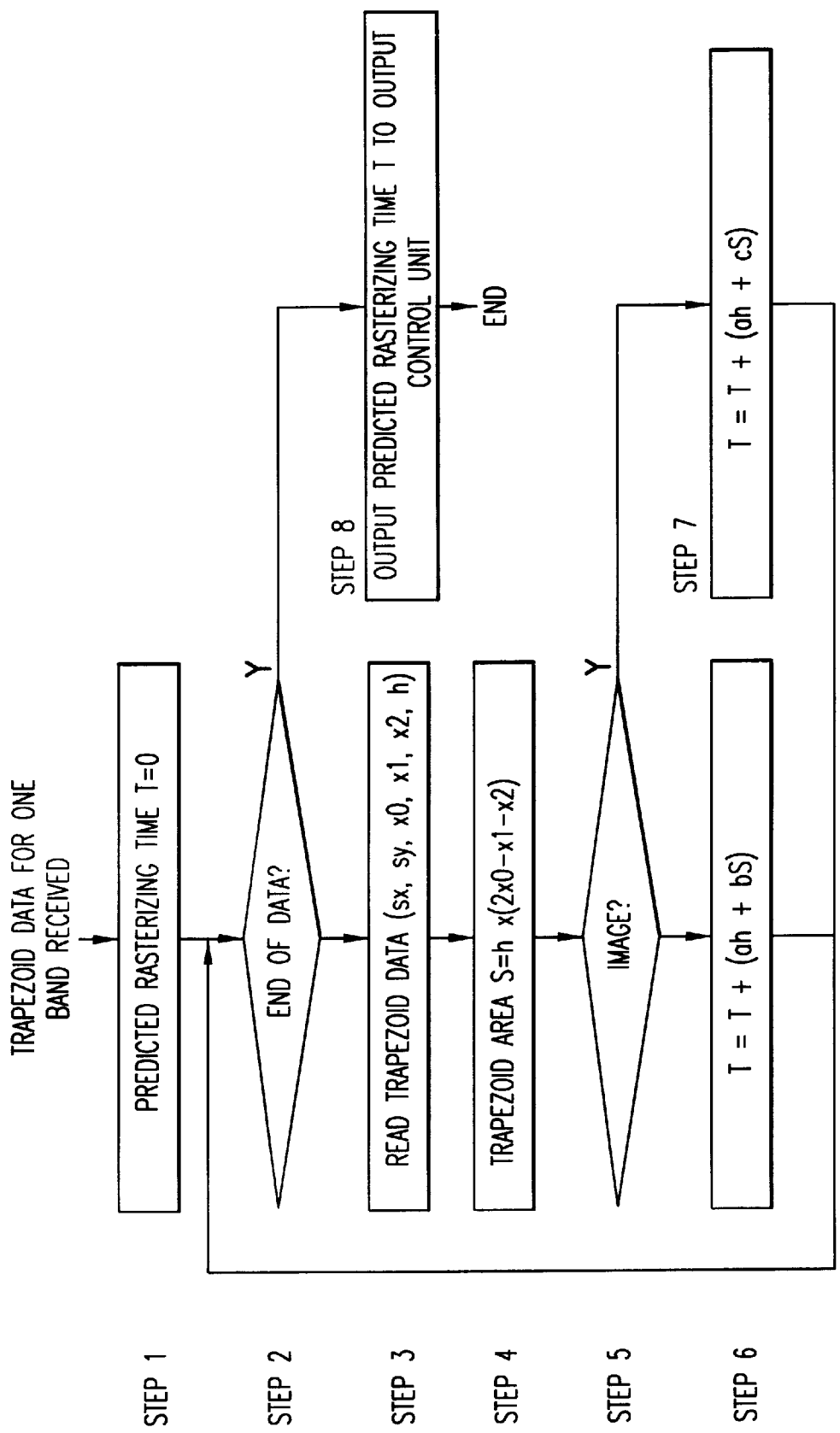
FIG. 17 is a flowchart of steps in which the rasterizing time predicting unit operates.

In step 1 of FIG. 17, a predicted rasterizing time T is set to 0. In step 2, a check is made to see if the trapezoid data to be processed come to an end. If no more trapezoid data are found, step 8 is reached in which the predicted rasterizing time T is output to the output control unit 6 and the processing is terminated. If trapezoid data to be processed still exist, step 3 and subsequent steps are reached and carried out. In step 3, the next trapezoid data (sx, sy, X0, X1, X2, h) are read from among the band-wise trapezoid data groups. In step 4, the area S of the trapezoid in question is computed on the basis of the trapezoid data. The trapezoid area S is obtained by carrying out the expression shown in step 4 of FIG. 17 using the trapezoid data given in FIG. 6B. In step 5, a check is made to see if the trapezoid is a text/graphic type or an image type. If the trapezoid is a text/graphic type, step 6 is reached; if the trapezoid is an image type, step 7 is reached. In step 6, the predicted time T is updated by performing the expression shown in step 6 of FIG. 17 using the trapezoid data and the area S obtained in step 4. Step 6 is followed by step 2. In step 7, the predicted time T is likewise updated by carrying out the expression shown in step 7 of FIG. 17 using the trapezoid data and the area S acquired in step 4. Step 7 is also followed by step 2.

In the description above, the predicted rasterizing time of the trapezoid in question is obtained through weighted additions of a trapezoid height "h" and the trapezoid area S as shown in steps 6 and 7 of FIG. 17. The computations are determined depending on a specific method by which the first embodiment draws trapezoids. If other methods are adopted, different computations will be adopted.

The computations outlined in FIG. 17 are described below from other aspects. If text "a" represents the time it takes to process one line of computation for obtaining coordinates of a left- or right-hand side of a trapezoid through a DDA (digital differential analyzer) or the like, then the time required to compute the coordinates of the left- or right-hand side of a trapezoid having a height "h" is given as "ah." If text "b" denotes the time it takes to process one pixel in drawing a trapezoid interior, then the time required to draw a trapezoid having the area S is defined as "bS." The drawing time "b" per pixel varies significantly from text/graphic data to image data. This is because text/graphic data involve having the same pixel value drawn for the text or graphic in question, while image data have a different pixel value drawn for each pixel with reference to original image data. As a result, in step 5, a distinction is made between text/graphic data and image data, and a different coefficient "c" is utilized if image data are involved. The coefficients "a," "b," and "c" are established beforehand in a coefficient table and are read therefrom as needed and used by the predicting process unit 50.

The image coefficient "c" may vary depending on such conditions as input image attributes and processing methods of the rasterizing process unit 4. In such cases, different conditions need to be dealt with by the respectively relevant coefficients "c" so that predicted times will be computed in each of subdivided processes making up step 5.

The output control unit 6 will now be described in detail.

Figure 18:
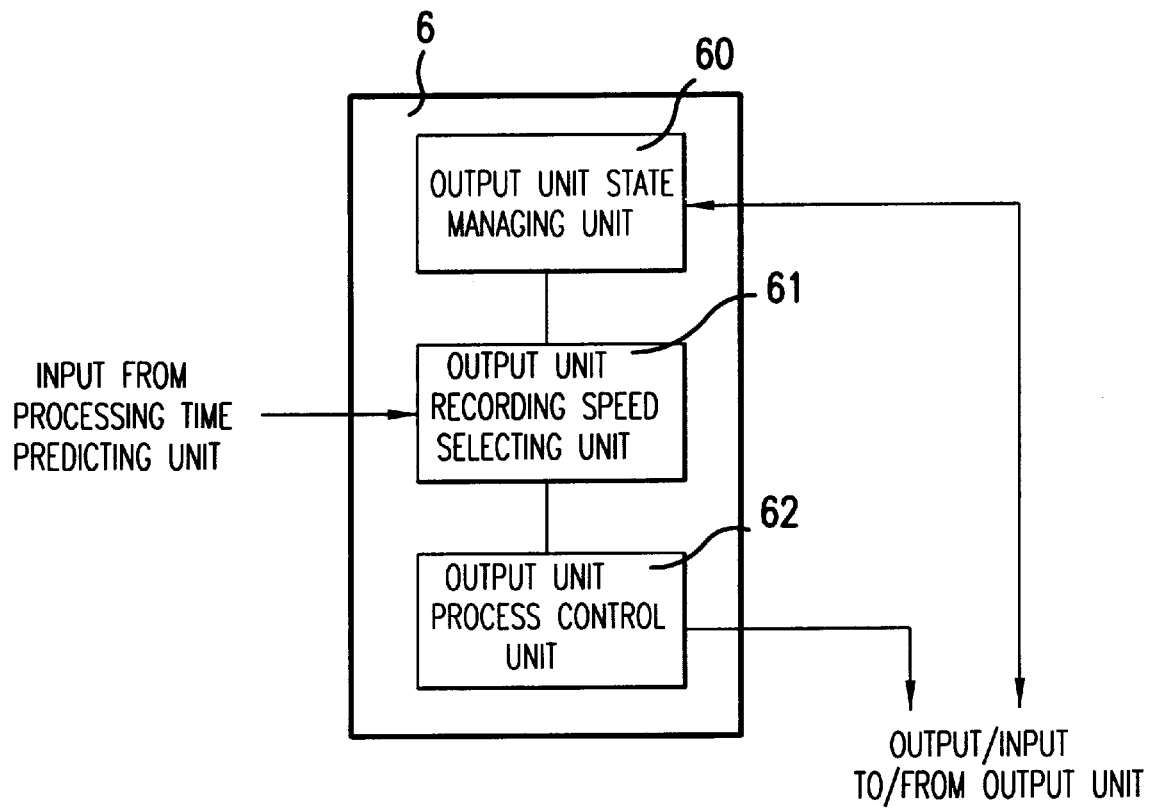
FIG. 18 is a block diagram of an output control unit.

FIG. 18 is a block diagram showing a typical constitution of the output control unit 6. The output control unit 6 comprises an output unit state managing unit 60, an output unit recording speed selecting unit 61, and an output unit process control unit 62.

The output unit state managing unit 60 manages the state of the output unit 7 in accordance with events that occur as a result of a state change in the output unit 7 as well as with a state request from the output unit recording speed selecting unit 61. Typical events that take place as a result of the state change in the output unit 7 include an output unit failure resulting in disabled printing and a shortage of recording paper. The moment the rasterizing time predicting unit 5 sends in a predicted rasterizing time, the output unit recording speed selecting unit 61 queries the output unit state managing unit 60 about failure of a defective output unit to print data, about a shortage of paper, and about other irregularities. In turn, the output unit state managing unit 60 notifies the output unit recording speed selecting unit 61 of any irregularities that may have occurred in the output unit 7. If the output unit 7 is found to be capable of printing, the output unit recording speed selecting unit 61 determines an appropriate recording speed of the output unit 7 on the basis of the predicted rasterizing time received from the rasterizing time predicting unit 5.

For the output unit 7, the output unit recording speed selecting unit 61 selects from among a number of alternative set points a recording speed such that the rasterizing of data per band as well as the transfer of intermediate data from the intermediate data generating unit 31 of the generating process unit 3 to the rasterizing process unit 4 will take place in time, with no data missing from the printed result. The selection of such a recording speed is made on the basis of two factors: band-wise predicted rasterizing times which are received from the rasterizing time predicting unit 5 and which reflect the size of the band buffer memory in effect, and volumes of intermediate data per band. With the first embodiment, as described, the transfer of intermediate data from the intermediate data generating unit 31 to the rasterizing process unit 4 is performed in real time to guarantee transmission bands. This makes it possible to compute the intermediate data transfer time based on the volumes of intermediate data.

Figure 19:
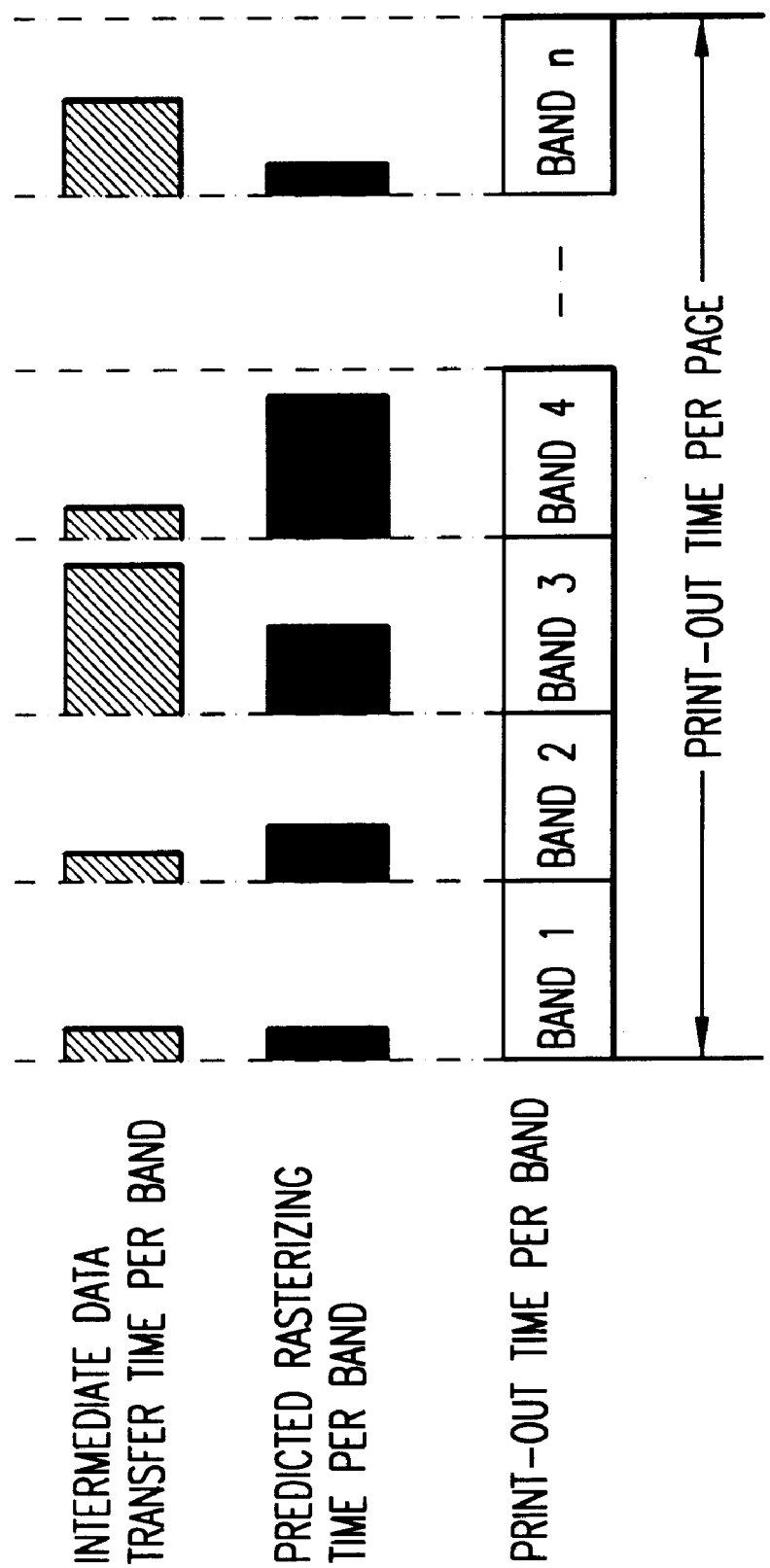
FIG. 19 is a schematic view explaining how an output unit recording speed selecting unit illustratively selects a recording speed.

FIG. 19 is a schematic view explaining how the output unit recording speed selecting unit 61 illustratively selects a recording speed. In FIG. 19, one page is divided into "n" bands, and the predicted rasterizing time and intermediate data transfer time vary from one band to another. Meanwhile, an xerographic page printer for use with the invention must be driven at a constant speed at least within one page. This means that the printing time is the same for every band. In order to terminate the rasterizing of data on the next band before the end of the printing of the current band, it is necessary to select a recording speed that makes the printing time per band longer than the longest predicted rasterizing time for any band (e.g., band 4 in FIG. 19) or the longest time for transfer of intermediate data for any band (i.e., band 3 in FIG. 19). The recording speed selected by the output unit recording speed selecting unit 61 is reported to the output unit process control unit 62.

The output unit process control unit 62 controls the process of the output unit 7 in accordance with the recording speed selected by the output unit recording speed selecting unit 61. Process control of the output unit process control unit 62 includes control over the start timings of the output unit 7. Whereas the output unit 7 is controlled in start timings on the basis of the recording speed selected and reported by the output unit recording speed selecting unit 61, such control may be effected alternatively in keeping with the input of print data to the print data input unit 2. In particular, it is preferable to start at early stages the fusing unit 77, a polygon mirror motor of the semiconductor laser scanner 71 and other components which require relatively long cycle-up times.

In the laser-scan xerographic color page printer of the first embodiment, target parameters to be controlled in line with variable recording speeds of the output unit 7 during printing include: rotating speed of the photosensitive drum, rotating speed of the transfer drum, rotating speed of a fusing unit roll, rotating speed of recording paper transport rollers, rotating speed of the polygon mirror in the semiconductor laser scanner, rotating speed of a developing roll in the developing unit, transfer current, and rotating speed of a cleaner brush. Of these parameters, the rotating speed of the photosensitive drum, rotating speed of the transfer drum, rotating speed of the fusing unit roll, rotating speed of the recording paper transport rollers, rotating speed of the polygon mirror in the semiconductor laser scanner, rotating speed of the developing roll in the developing unit, and rotating speed of the cleaner brush need only be controlled in proportion to the recording speed. The transfer current may be controlled by regulating the settings of a constant-current source. Generally, the polygon mirror in the semiconductor laser scanner is driven by a brushless servo motor whose rotating speed is stabilized under PLL (Phase Locked Loop) control. Thus the rotating speed of the polygon mirror may be varied through division of a reference frequency under PLL control.

Alternatively, the semiconductor laser scanner may change its exposure scanning method in keeping with varying recording speeds by getting the video interface to "thin out" the exposure scan for printing, with the rotating speed of the polygon mirror held constant. This method makes it possible to establish 1/2, 1/3, . . . , 1/m of the maximum recording speed. Although the method provides fewer recording speed alternatives to choose from, there is no need to vary the rotating speed of the polygon mirror in the semiconductor laser scanner whose polygon mirror motor demands a prolonged cycle-up time. This enables the start-up of the component at an early stage in accordance with the input of print data to the print data input unit 2 as mentioned above.

The laser-scan xerographic color page printer of the first embodiment may be replaced by a solid-state scan xerographic color page printer incorporating an LED print head or the like. If the latter printer is adopted, the exposure scanning timings need only be changed. With no need for cycle-up operations, the solid-state scanning scheme involving the LED print head or the like is suitable for use with the present invention.

Second Embodiment

The second embodiment of the invention will now be described.

Figure 20:
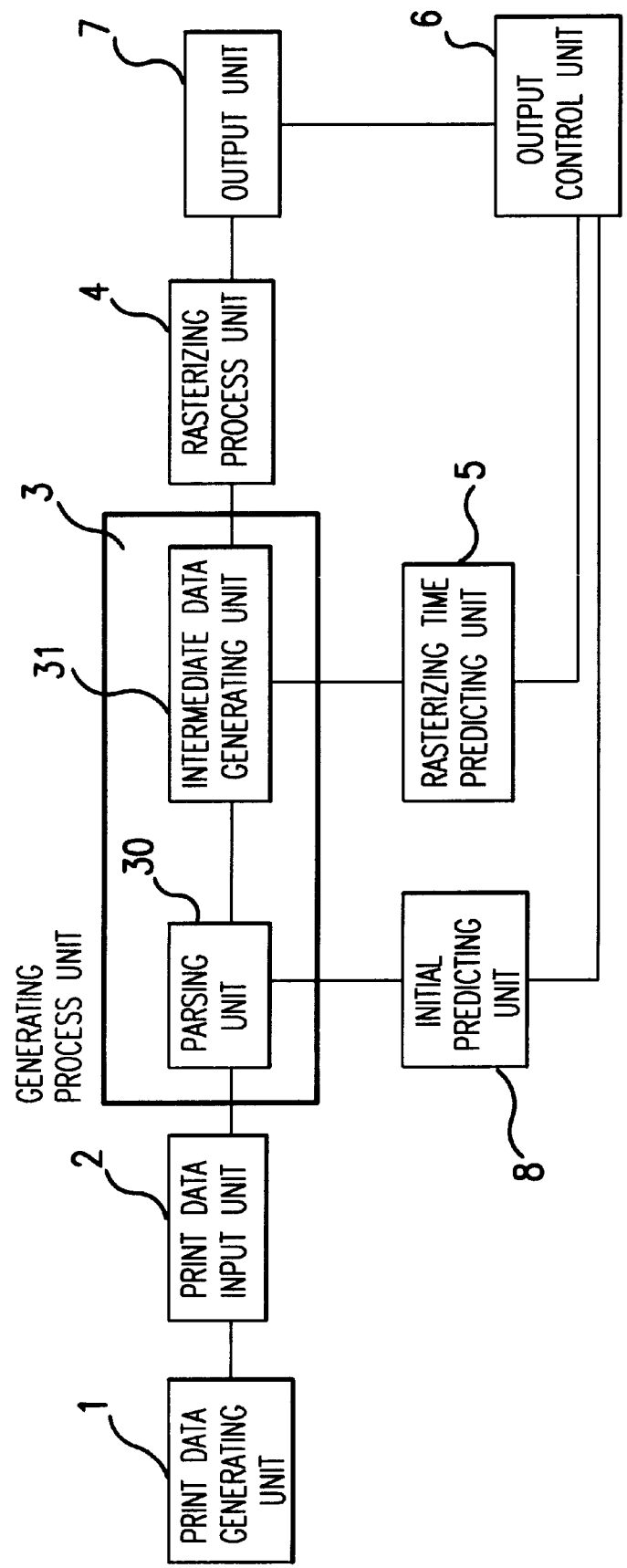
FIG. 20 is a block diagram of a print processor practiced as a second embodiment of the invention.

FIG. 20 is a block diagram of a print processor practiced as the second embodiment of the invention. In FIG. 20, the print processor comprises a print data generating unit 1, a print data input unit 2, a generating process unit 3, an rasterizing process unit 4, an initial predicting unit 8, an rasterizing time predicting unit 5, an output control unit 6, and an output unit 7. The generating process unit 3 includes a parsing unit 30 and an intermediate data generating unit 31.

In the above constitution, the print data generating unit 1, the print data input unit 2, the intermediate data generating unit 31 in the generating process unit 3, the rasterizing process unit 4, the rasterizing time predicting unit 5, and the output unit 7 are structurally identical to their counterparts in the first embodiment and thus will not be described further.

The parsing unit 30 extracts as tokens the print data coming from the print data input unit 2 in accordance with the syntax of a predetermined description language. The extracted tokens are output to the intermediate data generating unit 31 and to the initial predicting unit 8.

Given the tokens from the parsing unit 30, the initial predicting unit 8 interprets drawing instructions in the tokens, and counts the number of text, graphic and image drawing instructions contained in the print data for each of the bands corresponding to the sizes of the band buffer memories inside the rasterizing process unit 4. Through weighted additions of these instructions, the initial predicting unit 8 roughly predicts a generating time, an rasterizing time, and a volume of intermediate data with respect to each band. The predicted times and volume are output to the output control unit 6.

The output control unit 6 controls the output unit 7 in terms of start timings and recording speeds. More specifically, the output control unit 6 computes the start timing for a cycle-up operation of the output unit 7 and selects its recording speed on the basis of the predicted generating time, predicted rasterizing time, and predicted intermediate data volume received from the initial predicting unit 8.

The flow of print data in the print processor of the above constitution is summarized as follows: the print data generated by the print data generating unit 1 are forwarded via the print data input unit 2 to the parsing unit 30 of the generating process unit 3. The parsing unit 30 extracts tokens from the received print data and sends the tokens to the intermediate data generating unit 31 and to the initial predicting unit 8. Given the tokens, the initial predicting unit 8 interprets drawing instructions therein, and predicts the generating time, rasterizing time and intermediate data volume for each band through weighted additions of the text, graphic and image drawing instructions included in the print data. The predicted values per band are added up in increments of pages and output to the output control unit 6. On the basis of the generating time, rasterizing time and intermediate data values predicted by the initial predicting unit 8, the output control unit 6 computes the start timing for a cycle-up operation of the output unit 7 and selects a suitable recording speed, whereby the output unit 7 is started up. Thereafter, the recording speed of the output unit 7 is finalized according to band-wise rasterizing times predicted more accurately by the rasterizing time predicting unit 5. With the recording speed modified as needed, the output unit 7 is made to run at the finalized recording speed.

Meanwhile, the rasterizing process unit 4 receives the intermediate data and rasterizes the received data until a band buffer memory of the unit 4 is filled with print-out data first to be recorded by the output unit 7. When a cycle-up operation of the output unit 7 is completed, the print-out data are transferred in increments of lines from the band buffer memory to the output unit 7 for printing in accordance with the recording speed of the latter. While the print-out data from one band buffer memory are being printed, the other band buffer memory is being supplied with rasterized print-out data until the memory is full. The expansion into print-out data by the rasterizing process unit 4 and the printing by the output unit 7 are repeated for each of the colors used until the print data of a single page have been exhausted. If the print data are made up of a plurality of pages, the above operations are repeated until the output of all pages has come to an end.

The print processor practiced as the second embodiment has been outlined above. What follows is a detailed description of key components of this print processor.

First to be described is the initial predicting unit 8.

Figure 21:
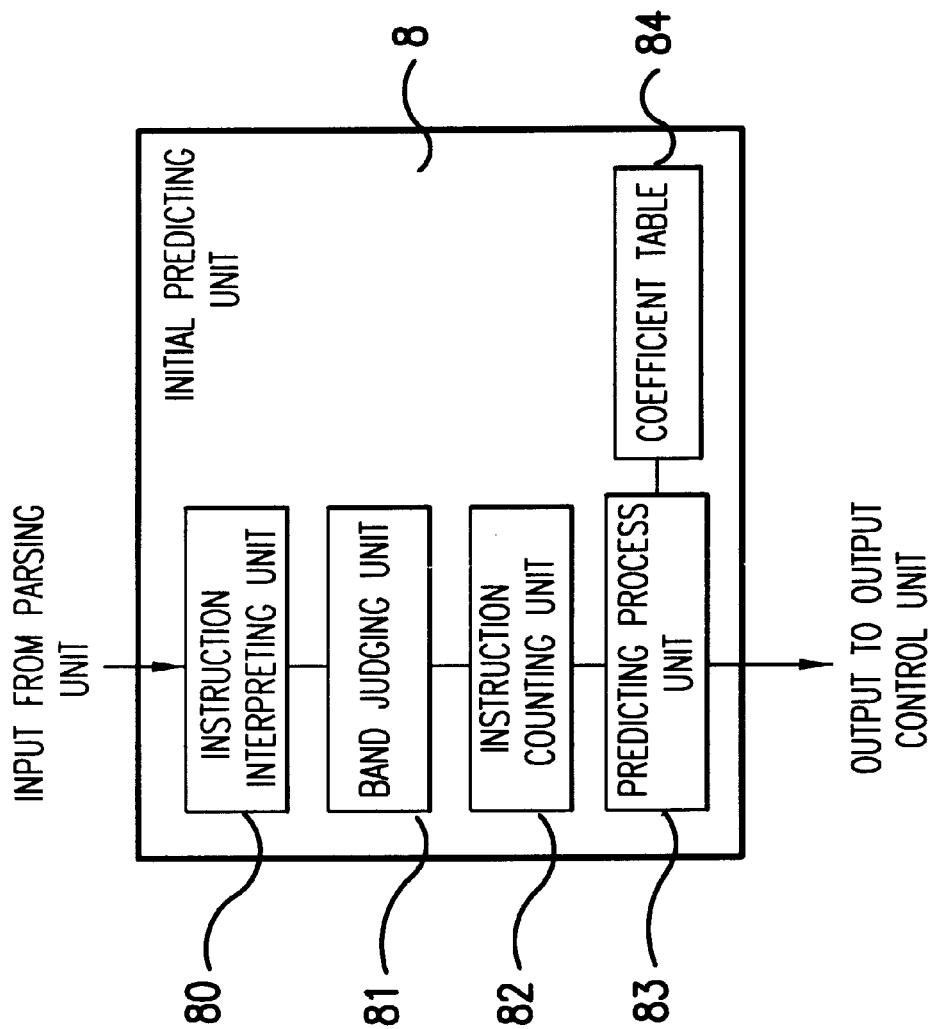
FIG. 21 is a block diagram of an initial predicting unit.

FIG. 21 is a block diagram depicting a typical constitution of the initial predicting unit 8. The initial predicting unit 8 comprises an instruction interpreting unit 80 that receives the output of the parsing unit 30 and interprets instructions contained therein; a band judging unit 81 that judges which band the interpreted drawing instructions belong to; an instruction counting unit 82 that counts the number of text, graphic and image drawing instructions per band on the basis of the interpreted instructions; a predicting process unit 83 that roughly predicts an intermediate data generating time, an rasterizing time and an intermediate data volume for each band based on the counted number of drawing instructions per object; and a coefficient table that stores coefficients needed by the predicting process unit 83. Although the coefficient table 84 may double as the coefficient table 51 for the rasterizing time predicting unit 5 described in connection with the first embodiment, it is assumed for the second embodiment that the two tables are separately provided.

The processing performed by the initial predicting unit 8 will now be described in detail. The print data extracted as tokens by the parsing unit 30 are input to the instruction interpreting unit 80. The instruction interpreting unit 80 interprets each instruction as a text, a graphic or an image drawing instruction or as some other instruction. The interpreted result is input to the band judging unit 81 which in turn judges which band the instruction in question belongs to. The result of the band judgment may involve a single or a plurality of bands. If the drawing range of an instruction spans a plurality of bands, the band numbers of these bands will be output. In the case of a Bezier graphic or like shapes whose drawing ranges are difficult to determine, the band judgment may be simplified by use of, say, only drawing control points.

The band judging unit 81 receives drawing instructions and outputs information designating the types of the received instructions and the bands to be drawn by these instructions. The result is input to the instruction counting unit 82. In turn, the instruction counting unit 82 counts the number of text, graphic and image drawing instructions for each of the bands involved. The instruction counts are input to the predicting process unit 83. In the unit 83, the counts are subjected illustratively to product-sum operations on the mean generating time per drawing instruction for each object stored in the coefficient table 84, as shown in expression (2) below, whereby a predicted generating time per band is obtained:

(Predicted generating time for a band)=(mean generating time per text)×(No. of text drawing instructions in the band)+(mean generating time per graphic)×(No. of graphic drawing instructions in the band)+(mean generating time per image)×(No. of image drawing instructions in the band)  (2)

In parallel with the above operations, the instruction counts are also subjected by the predicting process unit 83 to product-sum operations on the mean rasterizing time per drawing instruction for each object stored in the coefficient table 84, as shown illustratively in expression (3) below, whereby a predicted rasterizing time per band is acquired:

(Predicted rasterizing time for a band)=(mean rasterizing time per text)×(No. of text drawing instructions in the band)+(mean rasterizing time per graphic)×(No. of graphic drawing instructions in the band)+(mean rasterizing time per image)×(No. of image drawing instructions in the band)  (3)

Further in parallel with the above operations, the instruction counts are subjected by the predicting process unit 83 to product-sum operations on the mean intermediate data volume per drawing instruction for each object stored in the coefficient table 84, as shown illustratively in expression (4) below, whereby a predicted intermediate data volume per band is obtained:

(Predicted intermediate data volume for a band)=(mean intermediate data volume per text)×(No. of text drawing instructions in the band)+(mean intermediate data volume per graphic)×(No. of graphic drawing instructions in the band)+(mean intermediate data volume per image)×(No. of image drawing instructions in the band)  (4)

These operations, less burdensome than generating or rasterizing operations but still constituting an appreciable load on the processing, may be implemented by an alternative use of such lighter means as a look-up table replacing multiplication. While the description above says the expressions (2) through (4) are to be conducted for each band, they may be omitted if certain conditions are met. Illustratively, drawing texts usually involves less generating and rasterizing loads and smaller intermediate data volumes than drawing graphics or images. Thus if the number of graphic or image drawing instructions is lower than a predetermined threshold count, the processing of the expressions (2) through (4) may be omitted. In that case, the shortest band generating time, the shortest band rasterizing time and the smallest intermediate data volume held beforehand in the coefficient table 84 may be output alternatively as relevant predicted values. This scheme may be extended to the entire page. That is, if the number of graphic or image drawing instructions in a page is smaller than a predetermined threshold count, the counting of drawing instructions per band may be omitted, and the shortest band generating time, the shortest band rasterizing time and the smallest intermediate data volume may be output alternatively for all bands.

Although the predicted values were shown to be obtained per group of texts, graphics and images, this is not limitative of the invention. Alternatively, drawing instructions may be interpreted, grouped and counted in more finely defined increments for more accurate prediction. For example, texts may be counted after being grouped by such attributes as alphanumerics, katakana, kanji, point count, font type, and presence or absence of modifications. Graphics may be grouped by the graphic type (e.g., triangle, rectangle, polygon, circle), interior state, area, and type of vertex processing. Images may be grouped by the size, bit count, color space, presence or absence of such processes as scaling, rotation and affine transformation, and method of interpolation. These attributes may be used as the basis for grouping and counting the drawing commands, and the resulting counts may be subjected to product-sum operations on the relevant coefficients grouped and stored in the coefficient table 84. Such operations will provide more accurately predicted values than in the case of the grouping solely of texts, graphics and images performed above. In another alternative, the manner in which to group instructions may be varied in keeping with the generating time, rasterizing time and intermediate data volume parameters.

The present invention is not limited to the predicting process based on the number of drawing instructions. Predicting operations may be carried out using any quantities which are acquired from the output of the parsing unit 30 and which are relevant to the above-mentioned objects to be predicted. In such cases, it should be noted, the predicting expressions and the coefficients in the coefficient table 84 vary depending on the relations between the quantities in question on the one hand and the objects to be predicted on the other hand.

The output control unit 6 will now be described in detail.

Figure 22:
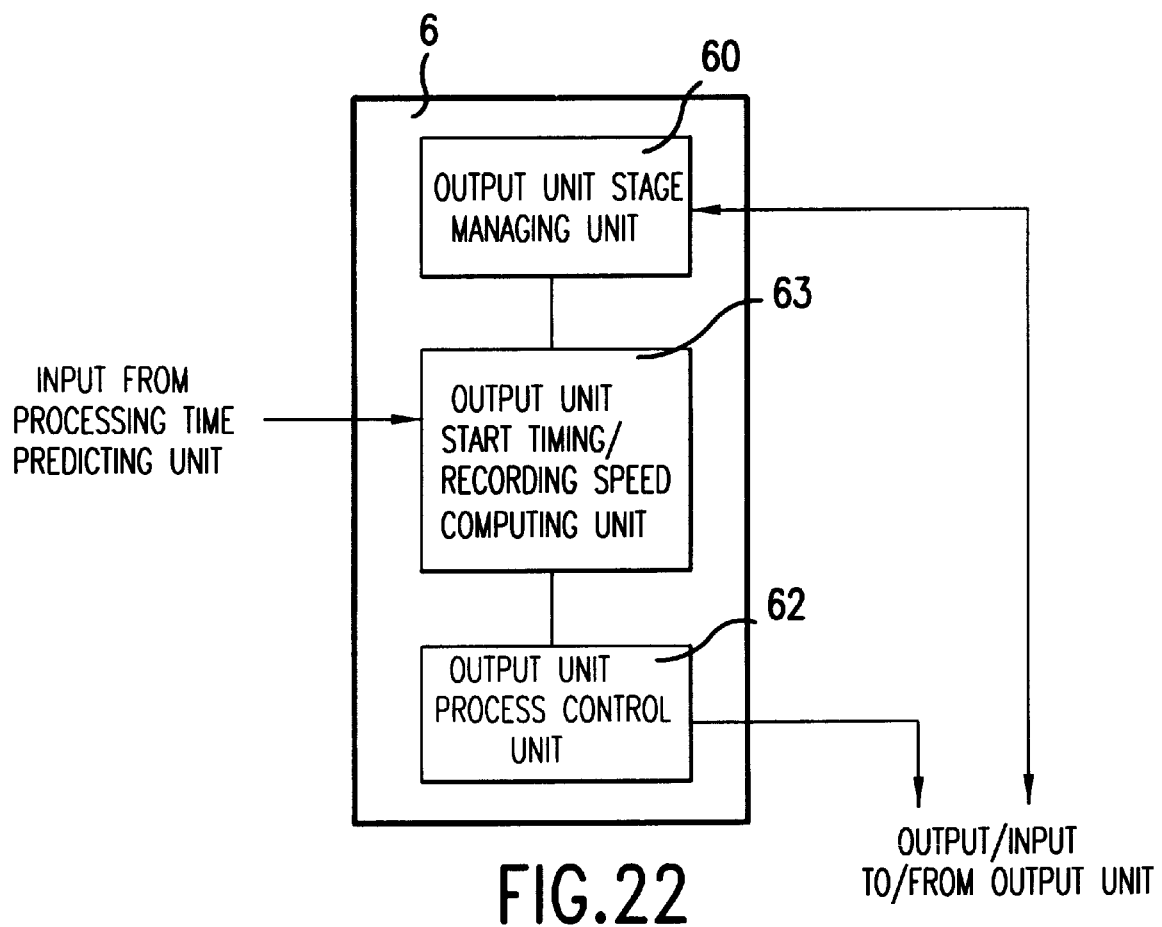
FIG. 22 is block diagram of an output control unit of the second embodiment.

FIG. 22 is a block diagram showing a typical constitution of the output control unit 6 of the second embodiment. This output control unit 6 comprises an output unit state managing unit 60, an output unit start timing/recording speed computing unit 63, and an output unit process control unit 62.

The output unit state managing unit 60 manages the state of the output unit 7 in accordance with events that occur as a result of a state change in the output unit 7 as well as with a state request from the output unit start timing/recording speed computing unit 63. Typical events that take place as a result of the state change in the output unit 7 include an output unit failure resulting in disabled printing and a shortage of recording paper. The moment the initial predicting unit 8 sends in a predicted generating time, a predicted rasterizing time and a predicted intermediate data volume, the output unit start timing/recording speed computing unit 63 queries the output unit state managing unit 60 about the temperature of the fusing unit roll, about the rotating speed of the polygon mirror in the semiconductor laser scanner, about failure of a defective output unit to print data, about a shortage of paper, and about other irregularities. In turn, the output unit state managing unit 60 notifies the output unit start timing/recording speed computing unit 63 of information such as the temperature of the fusing unit roll, the rotating speed of the polygon mirror in the semiconductor laser scanner, and the ability or inability of the output unit to print data. If the output unit 7 is found to be capable of printing, the output unit start timing/recording speed computing unit 63 computes the start timing and recording speed of the output unit 7 on the basis of the generating and rasterizing times and the intermediate data volume predicted and supplied by the initial predicting unit 8, and on the basis of the temperature of the fusing unit roll and the rotating speed of the polygon mirror in the semiconductor laser scanner received from the output unit state managing unit 60.

Given the input from the initial predicting unit 8 and from the rasterizing time predicting unit 5, the output unit start timing/recording speed computing unit 63 controls the output unit 7 in two steps. The first step involves computing a start timing and selecting a recording speed for a cycle-up operation of the output unit 7 on the basis of the predicted band-wise generating time, rasterizing time and intermediate data volume coming from the initial predicting unit 8. The second step comprises checking to see if the recording speed selected in the first step is appropriate in view of the predicted rasterizing time and intermediate data volume coming from the rasterizing time predicting unit 5, the second step further involving modification of the recording speed according to the result of the check. The computed start timing and the selected recording speed are sent from the output unit start timing/recording speed computing unit 63 to the output unit process control unit 62.

The manner of selecting the recording speed in the first and the second steps is similar to the way of recording speed selection with the first embodiment. With the second embodiment, as described above, the recording speed determined provisionally in the first step based on the input from the initial predicting unit 8 is subject to scrutiny in the second step in accordance with a more accurately predicted rasterizing time from the rasterizing time predicting unit 5. If the subsequent check finds the initially determined recording speed inappropriate, the output unit process control unit 62 is notified of the need to modify the recording speed.

Figure 23:
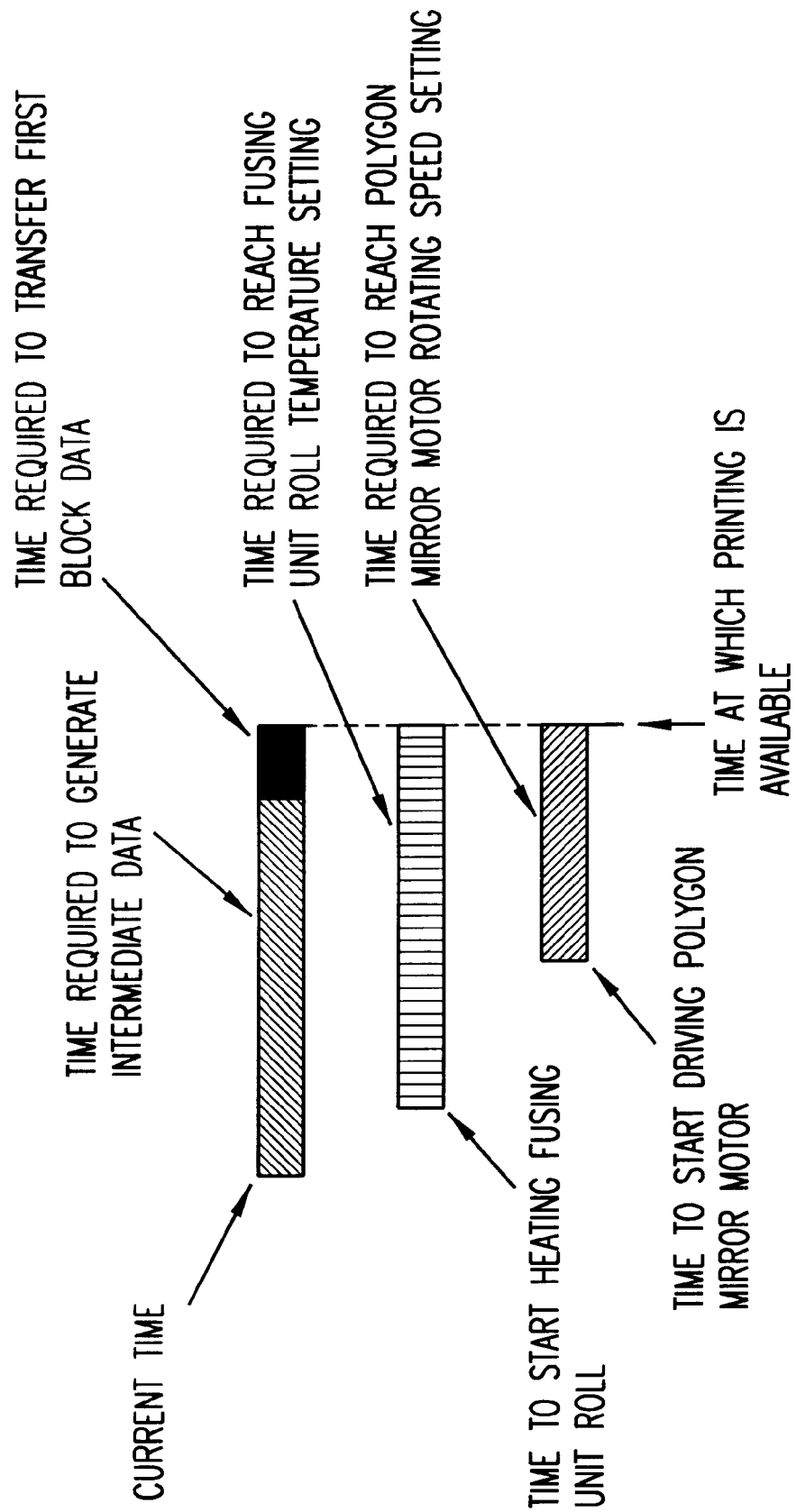
FIG. 23 is a chart explaining how an output unit start timing/recording speed computing unit is timed to start.

Described below with reference to FIG. 23 is how the start timing is computed in the first step, i.e., a newly added process of the second embodiment. Determining a start timing involves first computing the shortest possible print start-up time of the output unit based on the intermediate data generating time predicted by the initial predicting unit 8 as well as on the intermediate data transfer time of a first block. The intermediate data transfer time of the first block is computed from the intermediate data volume predicted for the first block and from the speed of data transfer from the generating process unit 3 to the rasterizing process unit 4.

With reference to the shortest possible print start-up time of the output unit, the time to start heating the fusing unit roll and the time to start driving the polygon mirror motor in the semiconductor laser scanner are computed illustratively by tracing backwards two time periods: the time it takes the fusing unit roll to reach a predetermined temperature, and the time it takes the polygon mirror motor in the semiconductor laser scanner to reach a predetermined rotating speed. How these two time periods are illustratively computed will now be described.

Two-document object tables are prepared in advance for predicting temperature setting times for the fusing unit roll and rotating speed setting times for the polygon mirror in the semiconductor laser scanner. Table 2 is a typical two-element table listing fusing unit roll temperatures and ambient temperatures, versus the corresponding times it takes the fusing unit roll to reach the predetermined temperature. Upon computing a start timing, the output unit state managing unit 60 is used to measure the current temperature of the fusing unit roll and the ambient temperature in effect at that point. Then the time required for the fusing unit roll to reach the predetermined temperature is calculated with reference to the two-element table.

TABLE 2

Times Required for Fusing Unit Roll to Reach Target Temperature (in seconds)

| Fusing Unit Roll Temperature | Ambient Temperature | | | | | |
|---|---|---|---|---|---|---|
| (° C.) | ~0 | ~10 | ~20 | ~30 | ~40 | ~50 |
| ~10 | 30 | 30 | — | — | — | — |
| ~20 | 30 | 25 | 25 | — | — | — |
| ~30 | 25 | 25 | 25 | 25 | — | — |
| ~40 | 25 | 25 | 20 | 20 | 20 | — |
| ... | ... | ... | ... | ... | ... | ... |
| 180~ | 10 | 10 | 10 | 15 | 15 | 15 |

Table 3 is another two-element table listing the times it takes the polygon mirror to reach target rotating speeds, versus rotating speeds in effect when the polygon mirror motor remain off. Upon computing a start timing, the output unit state managing unit 60 is used to measure the rotating speed currently in effect and to compute the time it takes the polygon mirror motor to reach the target rotating speed.

TABLE 3

Times Required for Polygon Mirror Motor to Reach Target Rotating Speed (in seconds)

| Rotating Speed | Target Rotating Speed (rpm) | | | |
|---|---|---|---|---|
| (rpm) | 4000 | 8000 | 12000 | 16000 |
| 0 | 10 | 10 | 15 | 15 |
| ~1000 | 10 | 10 | 15 | 15 |
| ~2000 | 5 | 10 | 15 | 15 |

TABLE 3-continued

Times Required for Polygon Mirror Motor to Reach Target Rotating Speed (in seconds)

| Rotating Speed | Target Rotating Speed (rpm) | | | |
|---|---|---|---|---|
| (rpm) | 4000 | 8000 | 12000 | 16000 |
| ~3000 | 5 | 5 | 10 | 15 |
| ... | ... | ... | ... | ... |
| ~16000 | 15 | 10 | 5 | 5 |

The output unit process control unit 62 provides process control of the output unit 7 on the basis of the start timing and recording speed determined by the output unit start timing/recording speed computing unit 63. In terms of start timings, the process involving the longest cycle-up operation is started the earliest, followed by those with shorter cycle-up operations which are initiated in a proportionately subsequent manner. As with the first embodiment, target parameters to be controlled in line with variable recording speeds of the output unit 7 during printing include: rotating speed of the photosensitive drum, rotating speed of the transfer drum, rotating speed of the fusing unit roll, rotating speed of recording paper transport rollers, rotating speed of the polygon mirror in the semiconductor laser scanner, rotating speed of the developing roll in the developing unit, transfer current, and rotating speed of the cleaner brush.

With the above-described embodiments, intermediate data which may be rasterized at high speed and which are expressed in a format containing basic graphics are generated from a group of drawing instructions and stored. The intermediate data thus acquired are rasterized into print-out data. Rasterizing times are predicted on the basis of the number of graphics included in the intermediate data and of the sizes of such graphics. The predicted results are used as the basis for controlling the recording speed of the output unit. This makes it possible for the output unit to process print data in accordance with their contents. The print data containing those complicated graphic drawing instructions in description language which were not addressed conventionally may thus be printed out with no decline in image quality. Under similar circumstances, image deterioration has occurred traditionally due to a mismatch between the performance of the rasterizing process unit and the recording speed of the output unit. Furthermore, the inventive constitution is supplemented with the initial predicting unit for predicting the generating and transfer times of intermediate data. The additional feature minimizes a wait time stemming from the output unit being unprepared and drastically reduces power dissipation of the latter.

Third Embodiment

The third embodiment of the invention will now be described. In describing the third embodiment, those parts that also appeared in the first embodiment are given the same reference numerals, and detailed descriptions of such parts are omitted where they are repetitive.

Figure 24:
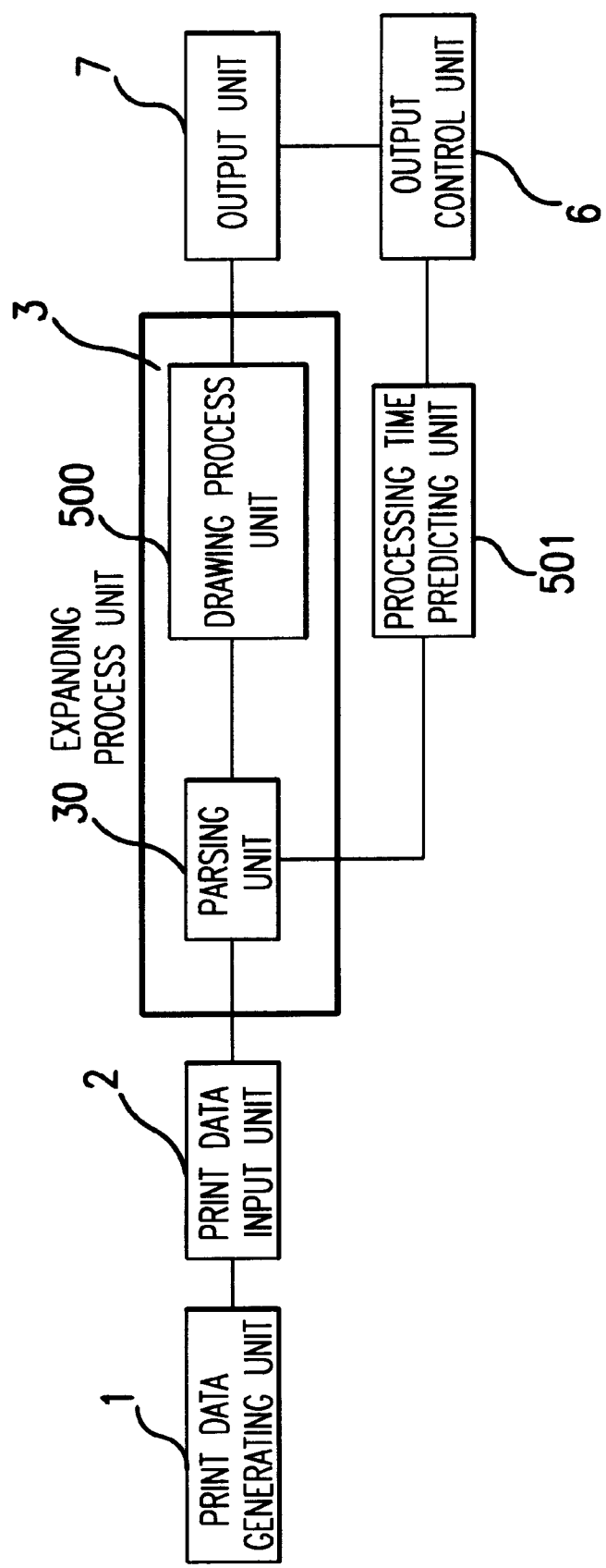
FIG. 24 is a block diagram of a print processor practiced as a third embodiment of the invention.

FIG. 24 is a block diagram of a print processor practiced as the third embodiment of the invention. In FIG. 24, the print processor comprises a print data generating unit 1, a print data input unit 2, an rasterizing process unit 3, a processing time predicting unit 501, an output control unit 6, and an output unit 7. The rasterizing process unit 3 includes a parsing unit 30 and a drawing process unit 500.

The print data generating unit 1 has functions to generate print data in description language from document data prepared by application programs (for document creation and editing) on a personal computer or a workstation. The description language handled by the third embodiment is illustratively GDI. Alternatively, PDF (Portable Document Format) represented by Acrobat or a page description language such as PostScript may be used instead.

The print data input unit 2 has communication functions to input print data generated by the print data generating unit 1, or has storage functions to accommodate print data temporarily before output to the rasterizing process unit 3.

The parsing unit 30 extracts as tokens the print data coming from the print data input unit 2 in accordance with the syntax of a predetermined description language. The extracted tokens are output to the drawing process unit 500 and to the processing time predicting unit 501.

Given the tokens from the parsing unit 30, the drawing process unit 500 interprets the received tokens, executes drawing instructions included therein and generates raster data. The drawing process of the drawing process unit 500 is carried out for each of the bands corresponding to the sizes of band buffer memories (515 and 516 in FIG. 25) inside the drawing process unit 500. The raster data stemming from the drawing process executed for each wise are accommodated as print-out data alternately into the two band buffer memories within the drawing process unit 500. As will be described later, the output unit 7 of the third embodiment is a color page printer. The print-out data accumulated alternately in the buffer memories correspond to recording color print data printed by the output unit 7. Subsequently the print-out data held in the band buffer memories are output alternately therefrom to the output unit 7 as demanded by the latter. The drawing process is carried out by the drawing process unit 500 in keeping with the performance of the output unit 7 (resolution, color reproduction textistic, tonal range, recording size, etc.).

Given the tokens from the parsing unit 30, the processing time predicting unit 501 interprets the drawing instructions in the tokens, generates drawing object data representing a drawing region from the types of the text, graphic and image drawing instructions contained in the print data as well as from the attributes of these drawing instructions, and divides the generated drawing object data in increments of bands corresponding to the sizes of the band buffer memories inside the drawing process unit 500. Then the processing time predicting unit 501 acquires a predicted drawing time for each band by adding up the total sum of predicted drawing times of the band-wise drawing object data and the processing time that elapses from generation of the drawing object data to division of the data in increments of bands. The predicted band-wise drawing times are added up per page and output to the output control unit 6. With the third embodiment, drawing object data are expressed as sets of simple graphics (e.g., trapezoids). The drawing process of the drawing process unit 500 includes at least a process equivalent to the generation of drawing object data by the processing time predicting unit 501.

The output control unit 6 controls output timings and recording speeds of the output unit 7. More specifically, on the basis of the predicted band-wise drawing times received in increments of pages from the processing time predicting unit 501, the output control unit 6 controls the recording speed of the output unit 7 so that the output of the latter unit will not exceed the predicted drawing time per band.

Under control of the output control unit 6, the output unit 7 receives the print-out data from the band buffer memories in the drawing process unit 500 and prints the received data onto recording paper. More specifically, the output unit 7 is a color page printer operating on the principle of laser-scan electrophotography and capable of outputting full color images by repeating exposure, developing and transfer for each of four colors C (cyan), M (magenta), Y (yellow) and Bk (black).

The flow of print data in the print processor of the above constitution is summarized as follows: the print data generated by the print data generating unit 1 are forwarded via the print data input unit 2 to the parsing unit 30 of the rasterizing process unit 3. The parsing unit 30 extracts tokens from the received print data and sends the tokens to the drawing process unit 500 and processing time predicting unit 501. The processing time predicting unit 501 interprets the drawing instructions in the received tokens, converts the text, graphic and image drawing instructions in the print data into drawing object data, and predicts a drawing time per band on the basis of the predicted drawing times added up for the drawing object data. The predicted drawing times per band are added up in increments of pages and output to the output control unit 6. On the basis of the drawing times predicted by the processing time predicting unit 501 for the respective bands, the output control unit 6 determines the recording speed of the output unit 7, activates the output unit 7, and runs the unit 7 at the recording speed thus determined.

Figure 25:
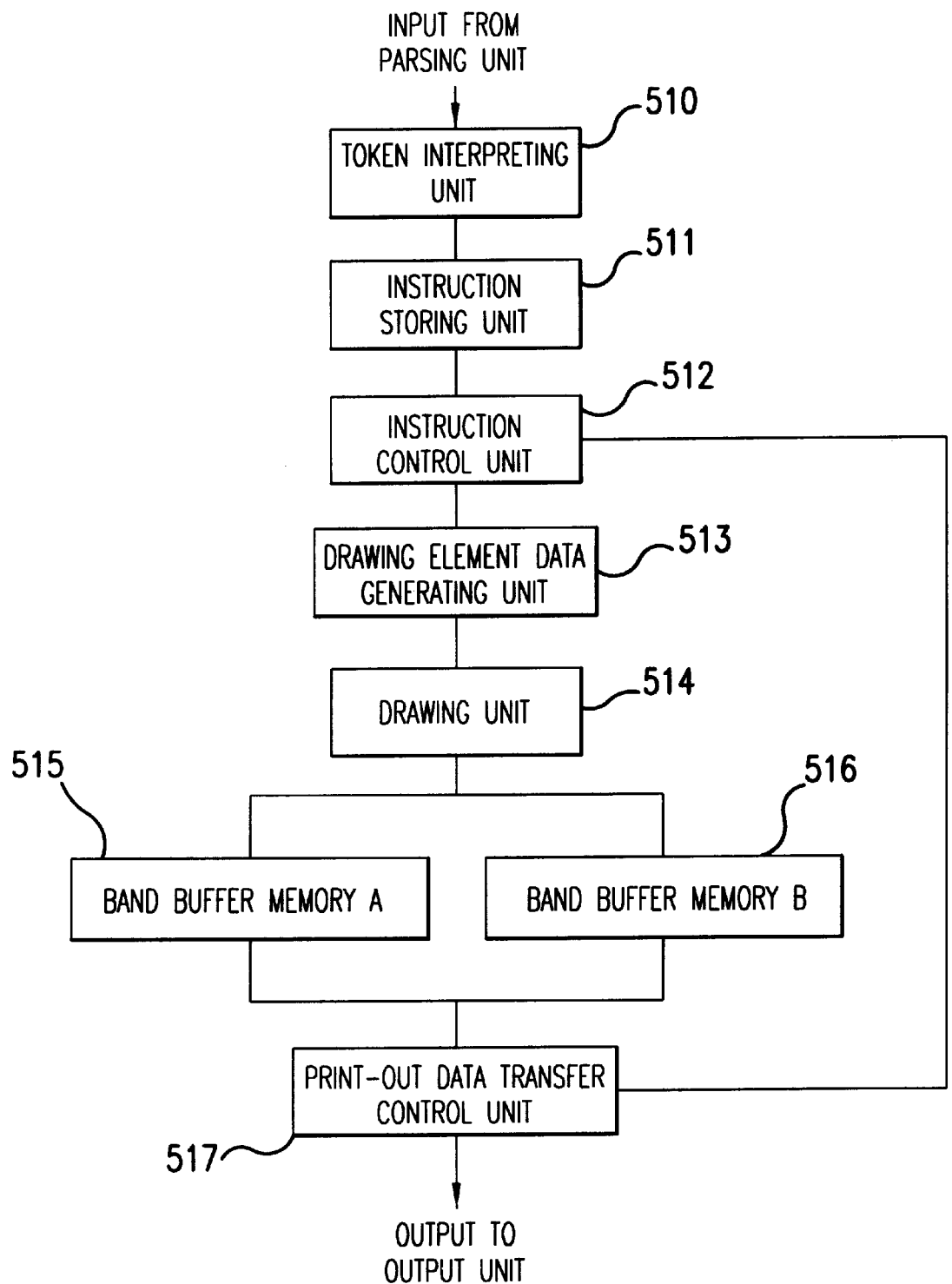
FIG. 25 is a block diagram of a drawing process unit.

Meanwhile, the drawing process unit 500 receives and interprets the tokens and proceeds with the drawing process until a band buffer memory is filled with print-out data first to be recorded by the output unit 7. When a cycle-up operation of the output unit 7 is completed, the print-out data are transferred in increments of lines from the band buffer memory to the output unit 7 for printing in accordance with the recording speed of the latter. While the print-out data from one band buffer memory are being printed, the drawing process is performed until the other band buffer memory has been filled with print-out data. The expansion into print-out data by the drawing process unit 500 and the printing by the output unit 7 are repeated for each of the colors used until the print data of a single page have been exhausted. If the print data are made up of a plurality of pages, the above operations are repeated until the output of all pages has come to an end. What follows is a detailed description of key components of the third embodiment. FIG. 25 is a block diagram depicting a typical constitution of the drawing process unit 500. The drawing process unit 500 comprises a token interpreting unit 510, an instructing storing unit 511, an instruction control unit 512, a drawing object data generating unit 513, a drawing unit 514, two band buffer memories 515 (A) and 516 (B), and a print-out data transfer control unit 517.

The token interpreting unit 510 interprets tokens received from the parsing unit 30, translates the received tokens into internal instructions and their arguments, and transfers sets of such internal instructions and arguments to the instruction storing unit 511. The internal instructions typically include drawing instructions for drawing texts, graphics and images as well as drawing state instructions for setting information necessary for drawing, such as colors and line attributes. Groups of the drawing instructions converted by the token interpreting unit 510 are stored in increments of pages in the instruction storing unit 511. The instruction storing unit 511 outputs drawing instruction groups repeatedly in increments of pages as requested by the instruction control unit 512 located downstream.

The instruction control unit 512 controls the entire processing of the drawing process unit 500. Specifically, the instruction control unit 512 repeats the following two processes for each of the bands involved, each band being divided into "n" portions in keeping with the sizes of the two band buffer memories 515 and 516: Process 1: The instruction control unit 512 notifies the drawing unit 514 of a band region change, and outputs coordinate data representing the band region to be processed from that point on. Process 2: The instruction control unit 512 reads the whole drawing instruction group regarding the currently processed page, and outputs the drawing instruction group to the drawing object data generating unit 513.

Figure 26:
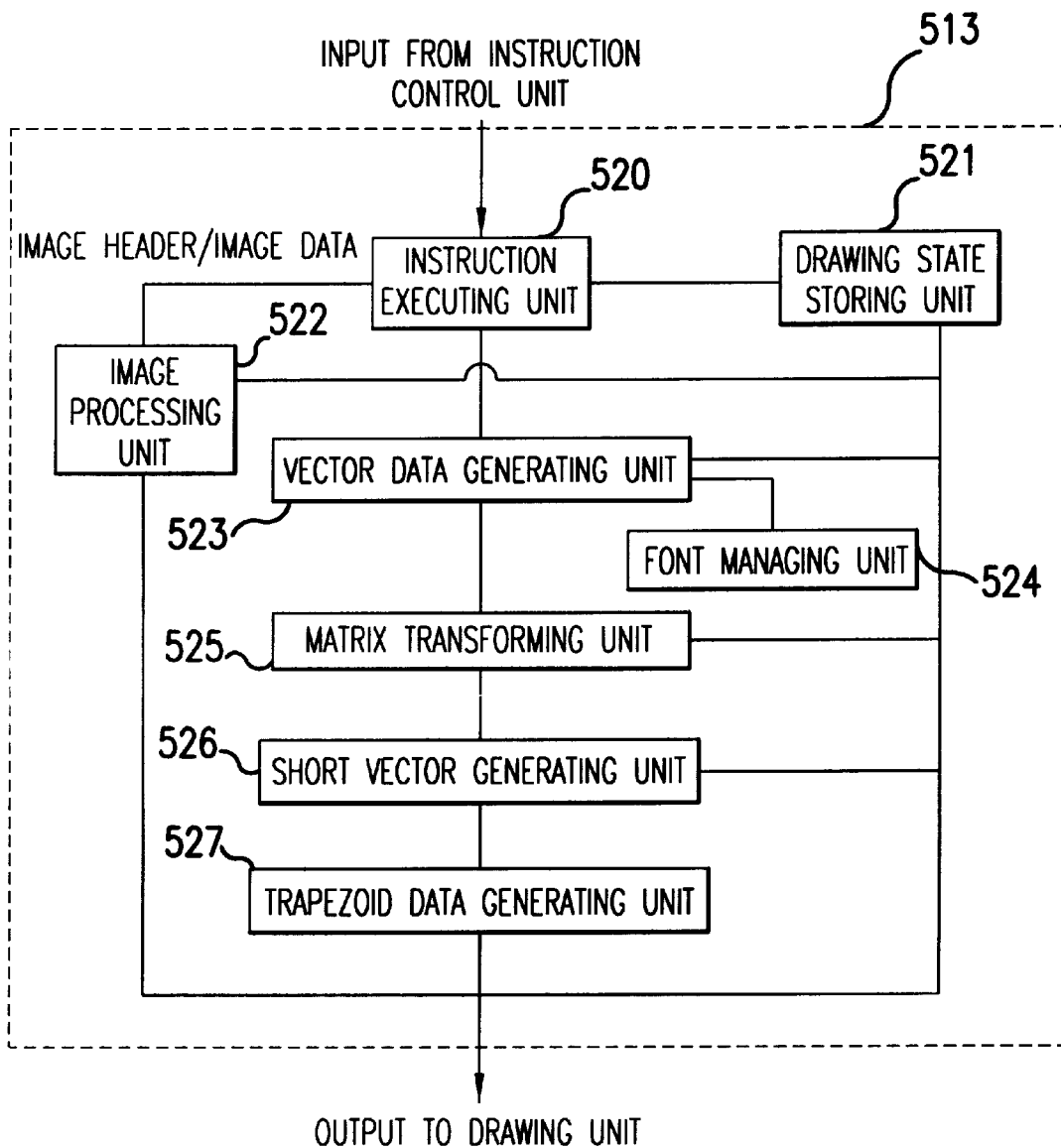
FIG. 26 is a block diagram of a drawing object data generating unit.

The drawing object data generating unit 513 generates drawing object data expressed in trapezoids in accordance with the types of drawing instructions in the drawing instruction group from the instruction control unit 512 as well as in accordance with the attributes of these drawing instructions. FIG. 26 is a block diagram showing a typical constitution of the drawing object data generating unit 513. The drawing object data generating unit 513 comprises an instruction executing unit 520, a drawing state storing unit 521, an image processing unit 522, a vector data generating unit 523, a font managing unit 524, a matrix transforming unit 525, a short vector generating unit 526, and a trapezoid data generating unit 527.

Depending on the type of drawing instructions from the instruction control unit 512, the instruction executing unit 520 forwards the instructions to the drawing state storing unit 521, to the image processing unit 522 or to the vector data generating unit 523. Based on the input image header and image data, the image processing unit 522 performs varieties of image processing to generate an output image header and output image data which are transferred to the drawing unit 514. The drawing state storing unit 521 stores information necessary for drawing, supplied by the instructions from the instruction executing unit 520. The vector data generating unit 523 generates vector data to be drawn using the instructions and their attached information from the instruction executing unit 520, the information from the drawing state storing unit 521, and the information from the font managing unit 524. The vector data thus generated are transferred to the matrix transforming unit 525. The font managing unit 524 manages and stores outline data on diverse fonts and provides text outline data as requested. The matrix transforming unit 525 subjects the vector data from the vector data generating unit 523 to affine transformation using a transformation matrix from the drawing state storing unit 521. After the transformation, the vector data are transferred to the short vector generating unit 526. The short vector generating unit 526 approximates a curve in the input vector using a set of multiple linear vectors (i.e., short vectors). The short vectors resulting from the approximation are sent to the trapezoid data generating unit 527. Using the input short vectors, the trapezoid data generating unit 527 generates trapezoid data to be drawn and transfers the generated data to the drawing unit 514.

How the components of the drawing object data generating unit 513 work will now be described in connection with specific data structures.

The instruction executing unit 520 executes internal instructions sent from the instruction control unit 521. The instructions thus executed are comprised mainly of drawing instructions and drawing state instructions. The types of the drawing instructions were already described in Table 1 above. Of the items of information listed, those underlined in the table are given as arguments of drawing instructions; the other items of information are placed initially or by the preceding instruction into the drawing state storing unit 521. Upon instruction execution, all drawing instructions except for the image drawing instruction are forwarded unchanged to the vector data generating unit 523. The image drawing instruction, when received, is transferred to the image processing unit 520 with the length and width of an image header transferred to the vector data generating unit 523. The drawing state instructions are transferred to the drawing state storing unit 521.

The drawing state storing unit 521 sets and stores illustratively the values of those arguments which are contained in the instructions received from the instruction executing unit 520 and which are not underlined in Table 1. The values are transferred as requested by the image processing unit 522, vector data generating unit 523, matrix transforming unit 525, and short vector generating unit 526. whose line is to have a required thickness. The vector thus generated (or a vector received directly from the instruction executing unit 520 in the case of region-fill) is transferred to the matrix transforming unit 525.

The font managing unit 524 stores outline vector data about various fonts. Given a text code and a font ID, the font managing unit 524 offers outline vector data about the text in question.

The matrix transforming unit 525 subjects the vector data from the vector data generating unit 524 to affine transformation using the transformation matrix obtained from the drawing state storing unit 521. The primary objective of affine transformation is to transform the resolution (coordinate system) of an application to a printer resolution (another coordinate system). The transformation matrix is a 3×3 type, given in the form of expression (1) which was shown earlier and which is again presented below. The input vector data (Xn, Yn) are transformed into output vector data (Yn', Yn') before being sent to the short vector generating unit 526.

$$(Xn', Yn') = (Xn, Yn) \begin{pmatrix} a & b & 0 \\ c & d & 0 \\ e & f & 1 \end{pmatrix} \quad (1)$$

Using a plurality of short vectors, the short vector generating unit 526 approximates a vector of a curve that may be included in the input vector so that the error of the as well as on the trapezoid data and image data generated by the drawing object data generating unit 513. The drawing unit 514 performs "clipping" using the coordinate data representing the band regions, and draws only those band regions that include the trapezoid data to be drawn. Initially, the drawing unit 514 extracts coordinate data such as the coordinates of image drawing regions or the coordinates of the vectors included in the individual trapezoid data, and refrains from executing any drawing instruction that is clearly dislodged from the band regions. Then the drawing unit 514 executes with no modification the drawing instructions whose trapezoid data have all their drawing portions included in the band. If only part of any drawing instruction covers a band region, a check is made on the individual drawing objects to see if each object falls into the band region by comparison using the coordinate values involved. Only those objects found within the band are drawn. The drawing unit 514 draws data alternately into either of the band buffer memories (A) 515 and (B) 516 every time a new band region to be drawn comes into effect. For example, if a band region is odd-numbered, the data are rasterized into the band buffer memory (A) 515; for an even-numbered band region, the data are rasterized into the band buffer memory (B) 516. Given drawing instructions from the instruction control unit 512, the drawing unit 514 subjects the instructions to color space transformation whereby the color space of the input image is transformed into a color space of the output unit 7 in accordance with the color reproduction textistic, tonal range approximated vector will become smaller than the value of flatness obtained from the drawing state storing unit 521. Illustratively, a Bezier curve expressed by four control points may be used as the curve vector. The Bezier curve is recurrently divided into short vectors. The dividing operation is terminated when the height (i.e., distance) becomes smaller than the value given as flatness. After the division, the start and end points of each of the Bezier curve segments are connected to one another, which completes the division into short vectors. The short vectors thus generated are sent to the trapezoid data generating unit 527.

The trapezoid data generating unit 527 generates from the input vector data a set of trapezoid data (triangles may occur but the data structure remains the same as with trapezoids) delimiting a drawing region. The generated trapezoid data are supplemented with management information indicating the type of trapezoid data (text, graphic or image type), with color information designating the color in which to paint the trapezoid data, or with image data information corresponding to the trapezoid data. The supplemented trapezoid data are sent to the drawing unit 514.

A train of operations ranging from the processing of the drawing unit 514 to that of a print-out data transfer unit 517 will now be described.

The drawing unit 514 performs drawing based on the coordinate data which are received from the instruction control unit 512 and which represent currently processed band regions, Through the use of the transformation matrix acquired from the drawing state storing unit 513, the image processing unit 522 subjects to affine transformation the input image header and image data, i.e., arguments of the instructions received from the instruction executing unit 520. The transformed image header and image data are transferred to the drawing unit 514.

Using the instructions and arguments from the instruction executing unit 520 as well as values from the drawing state storing unit 521, the vector data generating unit 523 generates vector data to be drawn anew with the exception of painting. For texts to be drawn, the text codes given by arguments and the font ID acquired from the drawing state storing unit 521 are first transferred to the font managing unit 524 which in turn yields text outline data. Because the outline data thus obtained do not include information about an origin of drawing (current point), an offset of the current point acquired from the drawing state storing unit 521 is added to the outline data, whereby the target vector data are generated. For an image to be drawn, a rectangular vector is first generated from the length and width of the image header supplied by the arguments. The vector is supplemented by an offset of the current point obtained from the drawing state storing unit 521, whereby the target vector data are generated. For strokes to be drawn, the vector furnished by arguments and various line attributes acquired from the drawing state storing unit 521 are used as the basis for generating an outline vector and other textistics of the output unit 7, or draws the data involved while carrying out screening processes such as dithering and FM screen.

The print-out data transfer control unit 517 reads print-out data in increments of words from the band buffer memories 515 and 516 filled with drawn data. The data thus read out are serially converted and output to the output unit 7. The band buffer memory into which the drawing unit 514 draws data is always different from the band buffer memory from which print-out data are read by the print-out data transfer control unit 517. The data output to the output unit 7 is performed in synchronism with a serial transfer clock signal received from the output unit 7. Suppose now that the print-out data transfer control unit 517 is reading data from the band buffer memory (A) 515. In that case, when all print-out data have been output to the output unit 7, the drawing unit 514 has completed its drawing of data into the band buffer memory (B) 516. Then the print-out data transfer control unit 517 starts reading print-out data from the band buffer memory (B) 516 and forwards the data to the output unit 7. At the same time, the print-data transfer control unit 517 notifies the instruction control unit 512 that the output of print-out data from the band buffer memory (A) 515 has come to an end. This prompts the instruction control unit 512 to go to the processing of the next band.

The processing time predicting unit 501 will now be described in detail.

Figure 27:
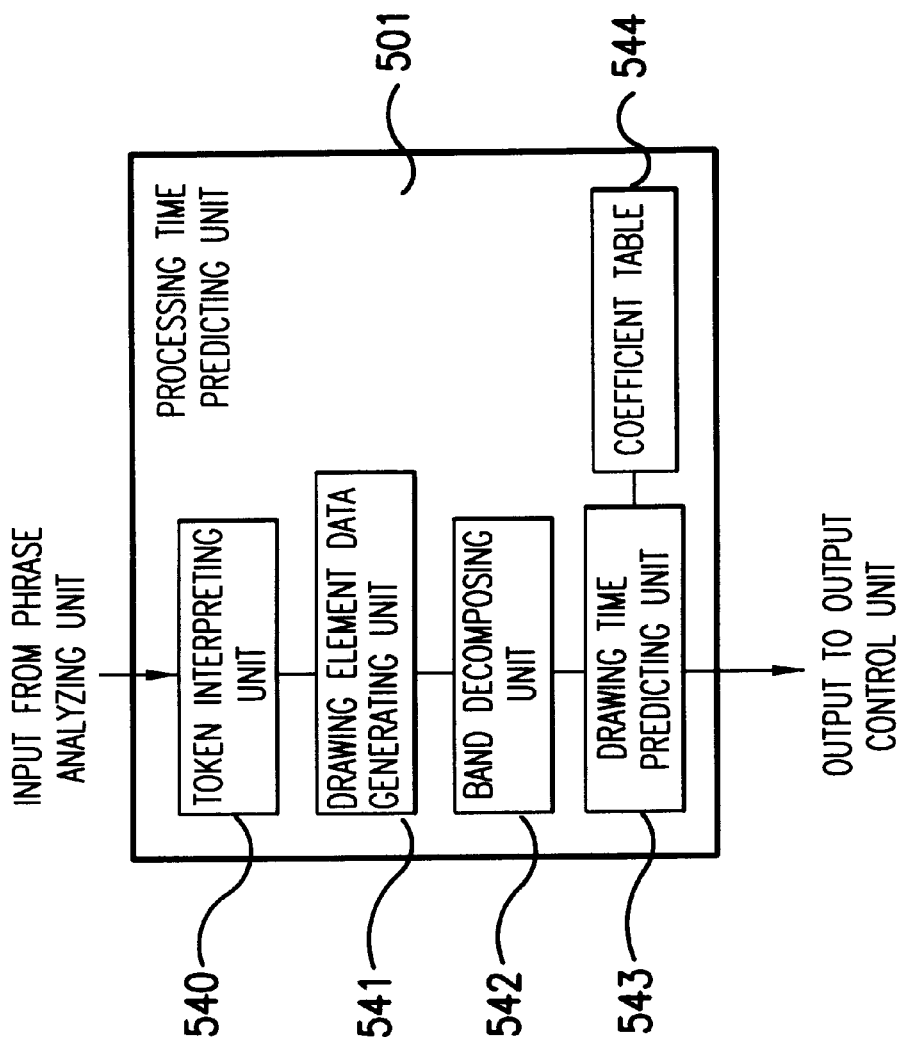
FIG. 27 is a block diagram of a processing time predicting unit.

FIG. 27 is a block diagram indicating a typical constitution of the processing time predicting unit 501. The processing time predicting unit 501 comprises a token interpreting unit 540, a drawing object data generating unit 541, a band decomposing unit 542, a predicting process unit 543, and a coefficient table 544.

Of the components making up the processing time predicting unit 501, the token interpreting unit 540 interprets tokens received from the parsing unit 30, transforms the received tokens into internal instructions and their arguments, and transfers sets of such internal instructions and arguments to the drawing object data generating unit 541. The drawing object data generating unit 541 generates drawing object data expressed in trapezoids in accordance with the types of drawing instructions in the drawing instruction group from the token interpreting unit 540 as well as in accordance with the attributes of these drawing instructions. That is, the token interpreting unit 540 and drawing object data generating unit 541 are functionally the same as the token interpreting unit 510 and drawing object data generating unit 513 of the drawing process unit 500. Detailed descriptions of the drawing object data generating unit 541 will be omitted.

Given the trapezoid data from the drawing drawing object data generating unit 541, the band decomposing unit 542 extracts only the trapezoid data regarding specific bands. The extracted trapezoid data are transferred per band to the drawing time predicting unit 543. If trapezoid data span a plurality of bands, the data are divided into trapezoid data portions representing the individual bands. Where four items of trapezoid data are divided by the band decomposing unit 542 illustratively into six trapezoid data portions, the trapezoid data portion regarding the band in question is transferred to the drawing time predicting unit 543.

The print data are converted by the band decomposing unit 542 into band-wise trapezoid data. The converted data are input to the drawing time predicting unit 543 in increments of bands in order to predict a drawing time per trapezoid. The predicted trapezoid-wise drawing times are accumulated so as to provide predicted drawing times for the individual bands. The predicted drawing times for each band are added to the processing time of the drawing object data generating time 541 as well as to the processing time of the band decomposing unit 542. The result of the addition is sent as the predicted band-wise drawing times to the output control unit 6.

How drawing times regarding trapezoid data are predicted will now be described in detail with reference to the flowchart of FIG. 28.

Figure 28:
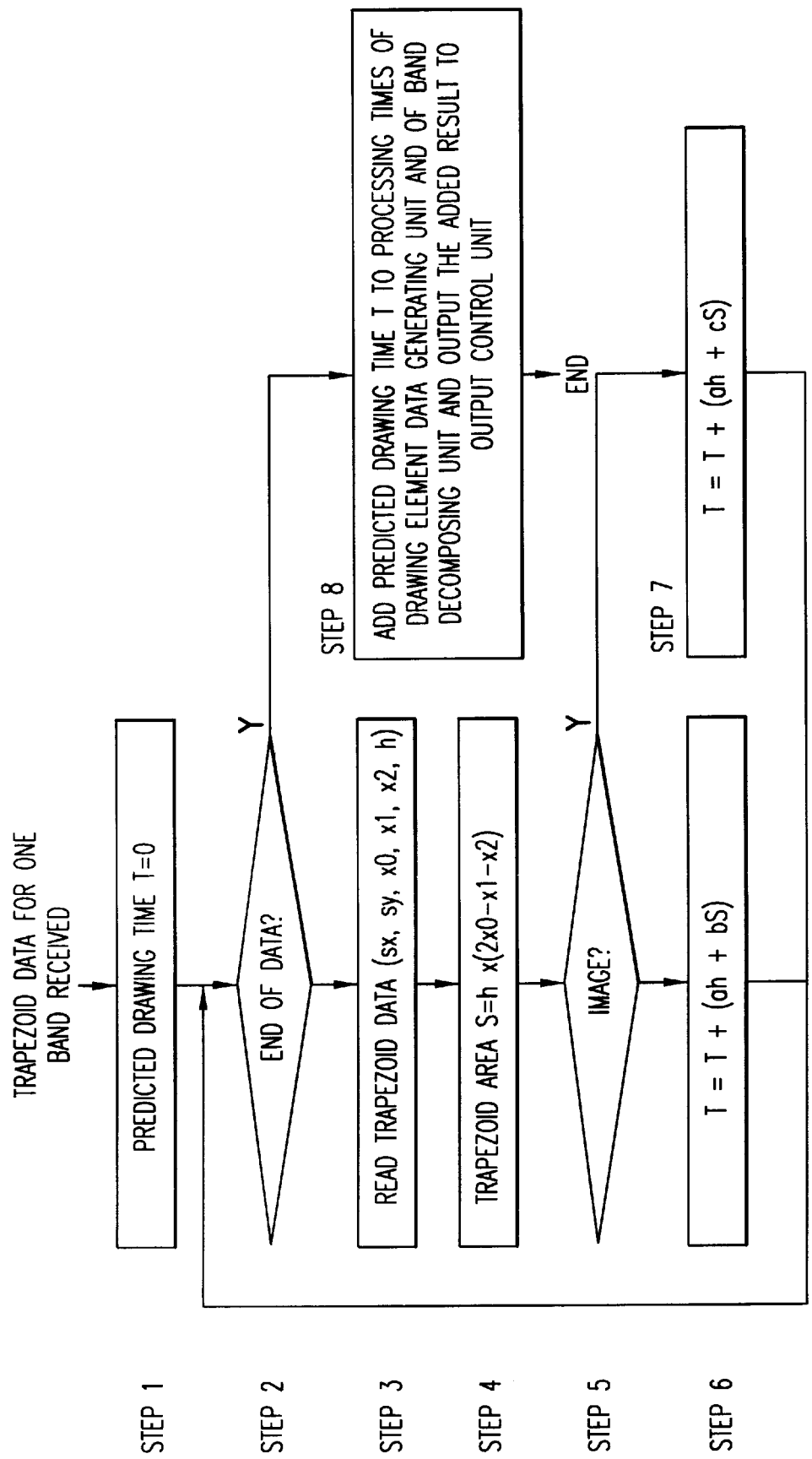
FIG. 28 is a flowchart of steps for computing a predicted drawing process time regarding trapezoid data.

In step 1 of FIG. 28, a predicted drawing time T is set to 0.

In step 2, a check is made to see if there remain any trapezoid data to be processed. If no such data are found to exist, step 8 is reached. In step 8, the predicted drawing time T is added to the processing time of the drawing object data generating unit 541 as well as to the processing time of the band decomposing unit 542. The result of the addition is output to the output control unit 6, and the processing is brought to an end. If there still remain trapezoid data to be processed, step 2 is followed by step 3 and subsequent steps.

In step 3, the next trapezoid data (sx, sy, X0, X1, X2, h) are read from among band-wise trapezoid data groups.

In step 4, an area S of the trapezoid in question is computed from the trapezoid data. The trapezoid area S is obtained by carrying out the expression shown in step 4 of FIG. 28 using the trapezoid data given in FIG. 6B.

In step 5, a check is made to see if the trapezoid is a text/graphic type or an image type. If the trapezoid is found to be a text/graphic type, step 6 is reached; if the trapezoid is an image type, step 7 is reached.

In step 6, the predicted time T is updated by performing the expression shown in step 6 of FIG. 28 using the trapezoid data and the area S obtained in step 4. Step 6 is followed by step 2. In step 7, the predicted time T is likewise updated by carrying out the expression shown in step 7 of FIG. 28 using the trapezoid data and the area S acquired in step 4. Step 7 is also followed by step 2.

In the description above, the predicted rasterizing time of the trapezoid in question is obtained through weighted additions of a trapezoid height "h" and the trapezoid area S as shown in steps 6 and 7 of FIG. 28. The computations are determined depending on a specific method by which the third embodiment draws trapezoids. If other methods are adopted, different computations will be adopted.

The computations outlined in FIG. 28 are described below from other aspects. If text "a" represents the time it takes to process one line of computation for obtaining coordinates of a left- or right-hand side of a trapezoid through a DDA (digital differential analyzer) or the like, then the time required to compute the coordinates of the left- or right-hand side of a trapezoid having a height "h" is given as "ah." If text "b" denotes the time it takes to process one pixel in drawing a trapezoid interior, then the time required to draw a trapezoid having the area S is defined as "bS." The drawing time "b" per pixel varies significantly from text/graphic data to image data. This is because text/graphic data involve having the same pixel value drawn for the text or graphic in question, while image data have a different pixel value drawn for each pixel with reference to original image data. As a result, in step 5, a distinction is made between text/graphic data and image data, and a different coefficient "c" is utilized if image data are involved. The coefficients "a," "b," and "c" are established beforehand in the coefficient table 544 and are read therefrom as needed and used by the drawing time predicting unit 543.

The image coefficient "c" may vary depending on such conditions as input image attributes and processing methods of the drawing process unit 500. In such cases, different conditions need to be dealt with by the respectively relevant coefficients "c" so that predicted times will be computed in each of subdivided processes making up step 5.

What textizes the prediction of drawing times by the third embodiment is that the degree of abstraction of print data is brought to a level low enough to permit the drawing process unit accurately to predict drawing times. Thus even where print data have localized portions requiring more burdensome processing than others within a page, drawing times are predicted precisely for each band.

With the third embodiment, the drawing times for each band are predicted by having the processing time of the drawing object data generating time 541 and the processing time of the band decomposing unit 542 added to the band-wise drawing times predicted on the basis of the predicted trapezoid data drawing times. Alternatively, the band-wise drawing times predicted on the basis of the predicted trapezoid data drawing times may be multiplied by a suitable coefficient, the result being output to the output control unit 6 as the predicted drawing times in increments of bands.

In the course of the operation of the drawing process unit 500, the process of the band decomposing unit 542 and that of the drawing time predicting unit 543 are repeated successively for each of the bands involved. Alternatively, the drawing object data about the entire page may be divided into increments of bands in advance and a drawing time may be predicted for each of these bands.

The semiconductor laser scanner used as part of the third embodiment may change its exposure scanning method in keeping with varying recording speeds by getting the video interface to "thin out" the exposure scan for printing, with the rotating speed of the polygon mirror held constant. This method makes it possible to establish 1/2, 1/3, . . . , 1/m of the maximum recording speed. Although the method provides fewer recording speed alternatives to choose from, there is no need to vary the rotating speed of the polygon mirror in the semiconductor laser scanner whose polygon mirror motor demands a prolonged cycle-up time. This enables the start-up of the component at an early stage in accordance with the input of print data to the print data input unit 2 as mentioned earlier.

The laser-scan xerographic color page printer of the third embodiment may be replaced by a solid-state scan xerographic color page printer incorporating an LED print head or the like. If the latter printer is adopted, the exposure scanning timings need only be changed. With no need for cycle-up operations, the solid-state scanning scheme involving the LED print head or the like is suitable for use with the present invention.

The third embodiment, as described, constitutes a print processor with band memories making up a storage unit for temporarily accommodating print-out data to be output by a page printer. The drawing process unit in the third embodiment rasterizes drawing instruction groups into print-out data for each band. Prior to the drawing process, the processing time predicting unit predicts the band-wise drawing times for the drawing process unit on the basis of the drawing object data such as trapezoid data. The predicted results are used as the basis for controlling the recording speed of the output unit. This makes it possible for the output unit to process print data in accordance with their contents. That in turn forestalls image deterioration that has occurred traditionally due to a mismatch between the performance of the drawing process unit and the recording speed of the output unit. The print data containing those complicated graphic drawing instructions in description language which were not addressed conventionally may thus be dealt with optimally in keeping with print data complexity.

As described, the print processor according to the invention generates from a group of drawing instructions intermediate data in a format containing basic graphics that may be rasterized at high speed, stores the intermediate data thus generated, and rasterizes the intermediate data into print-out data. At the same time, the inventive print processor predicts rasterizing times based on the number of graphics included in the intermediate data and on the sizes of such graphics, and controls the recording speed of the output unit in accordance with the predicted results. This makes it possible to process print data in accordance with their contents. The print data containing those complicated graphic drawing instructions in description language which were not addressed conventionally may be printed out with no decline in image quality. Under similar circumstances, image deterioration has occurred traditionally due to a mismatch between the performance of the rasterizing process unit and the recording speed of the output unit. Furthermore, the inventive constitution is supplemented with the initial predicting unit for predicting the generating and transfer times of the intermediate data. The additional feature minimizes a wait time stemming from the output unit being unprepared and drastically reduces power dissipation of the latter.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A print processor comprising:

input means for inputting print data including at least either texts or graphics and described in predetermined drawing instructions;

image output means for outputting images based on data having a predetermined data structure;

intermediate data generating means for generating intermediate data from said print data, said intermediate data being expressed in a format which is higher in abstract terms than said data structure and which includes at least one basic graphic, wherein said intermediate data are made of said print data expressed by a plurality of vector data per basic graphic and by composite attributes for composing said vector data;

rasterizing process means for rasterizing said intermediate data into said data structure and for supplying said image output means with the intermediate data thus rasterized;

determining means for determining a number and a size of the basic graphics constituting said intermediate data generated by said intermediate data generating means;

rasterizing time predicting means for predicting the time it tasks said rasterizing process means to rasterize said intermediate data on the he basis of the number and the size of said basic graphics determined by said determining means, wherein said rasterizing time predicting means has predetermined coefficients of correspondence between vector data values of said basic graphics on the one hand the time it takes said rasterizing process means to rasterize said intermediate data on the other hand; and control means for determining an image output speed of said image output means in accordance with the time predicted by said rasterizing time predicting means.

2. A print processor according to claim 1, wherein said vector data include a height of said basic graphics as the size thereof.

3. A print processor according to claim 1, wherein said vector data include a height and an area of said basic graphics as the size thereof.

4. A print processor according to claim 1, wherein said coefficients of correspondence are determined beforehand in accordance with the format in which said rasterizing process means rasterizes said intermediate data.

5. A print processor comprising:

input means for inputting print data including at least either texts or graphics and described in predetermined drawing instructions;

image output means for outputting images based on data having a predetermined data structure;

intermediate data generating means for generating intermediate data from said print data, said intermediate data being expressed in a format which is higher in abstract terms than said data structure and which includes at least one basic graphic;

rasterizing process means for rasterizing said intermediate data into said data structure and for supplying said image output means with the intermediate data thus rasterized;

first predicting means for predicting the time it takes said intermediate data generating means to generate said intermediate data and the time it takes said rasterizing process means to rasterize said intermediate data;

first control means for determining an image output speed of said image output means and a time at which said image output means is started, in accordance with the time predicted by said rasterizing time predicting means;

determining means for determining a number and a size of the basic graphics constituting said intermediate data generated by said intermediate data generating means;

second predicting means for predicting the time it takes said rasterizing process means to rasterize said intermediate data on the basis of the number and the size of said basic graphics determined by said determining means; and second control means for changing that image output speed of said image output means which is determined by said first control means, in accordance with the time predicted by said second predicting means.

6. A print processor according to claim 5, wherein said first predicting means includes:

classifying means for classifying said print data into groups in accordance with one of two criteria, one criterion being either a type or an attribute of said drawing instructions, the other criterion being a combination of a type and an attribute of said drawing instructions; and counting means for counting the number of said drawing instructions included in each of said groups classified by said classifying means;

wherein said first predicting means predicts the time it takes said intermediate data generating means to generate said intermediate data and the time it takes said rasterizing process means to rasterize said intermediate data, on the basis of the number of sad drawing instructions counted by said counting means.

7. A print processor according to claim 5, wherein said second control means lowers the image output speed determined by said first control means if the predicted rasterizing time is not in accord with said image output speed determined by said first control means for said image output means.

8. A print processor comprising:

input means for inputting print data including at least either texts or graphics and described in predetermined drawing instructions;

image output means for outputting images based on data having a predetermined data structure;

intermediate data generating means for generating intermediate data from said print data, said intermediate data being expressed in a format which is higher in abstract terms than said data structure, wherein said intermediate data are made of said print data expressed by a plurality of vector data per basic graphic and by composite attributes for composing said vector data;

rasterizing process means of rasterizing said intermediate data into said data structure and for supplying said image output means with the intermediate data thus rasterized;

determining means for determining a number and a size of basic graphics constituting said intermediate data generated by said intermediate data generating means;

rasterizing time predicting means for predicting the time it takes said rasterizing process means to rasterize said intermediate data on the basis of the number and the size of said basic graphics determined by said determining means wherein said rasterizing time predicting means has predetermined coefficients of correspondence between vector data values of said basic graphics on the one hand the time it takes said rasterizing process means to rasterize said intermediate data on the other hand; and control means of determining an image output speed of said image output means in accordance with the time predicted by said rasterizing time predicting means.

9. A print processor according to claim 8, wherein said intermediate data generating means comprises:

vector data generating means for generating a plurality of vector data from said print data; and data generating means for expressing said print data using said plurality of vector data generated by said vector data generating means.

10. A print processor comprising:

input means for inputting print data including at least either texts or graphics and describe in predetermined drawing instructions;

image output means;

drawing object generating means for generating from the said print data drawing object data representing drawing regions on the basis of a type and an attribute of said drawing instructions;

drawing process means for rasterizing the drawing object data generated by said drawing object generating means into a data structure suitable for output through said image output means, wherein said drawing process means includes a page rasterizing process means for rasterizing a single page of said drawing object data, specific region rasterizing process means for dealing with a specific region constituted by data rasterized by said page rasterizing process means, said specific region rasterizing process means further rasterizing the data constituting said specific region into a data structure suitable for output through said image output means, and different region rasterizing process means for dealing with a region different from said specific region rasterizing process means, said different region rasterizing process means further rasterizing data constituting said different region into said data structure suitable for output through said image output means;

region forming means for dividing the drawing object data generated by said drawing object generating means into a plurality of regions within a page;

drawing time prediction means for predicting the time it takes to draw each of said plurality of regions at least on the basis of the total sum of predicted times required to draw the drawing object data included in the respective regions; and control means for determining an image output speed of said image output means in accordance with the drawing time predicted by said drawing time predicting means regarding each of said plurality of regions.

11. A print processor according to claim 10, wherein said drawing time predicting means predicts said drawing time by adding a processing time of said drawing object generating means, a processing time of said region forming means, and the drawing times summed up for each of said plurality of regions regarding said drawing object data.

12. A print processor according to claim 10, wherein said drawing object data are constituted at least by vector data representing a region to be drawn and by attribute information about said region.

13. A print processor according to 10, wherein said drawing time predicting means has coefficients for acquiring the predicted drawing times about said drawing object data.

14. A print processor according to claim 10, wherein said image output means has a plurality of image output speeds, and wherein said control means controls said image output means so as to determine one of said plurality of image output speeds for each page on the basis of the drawing time predicted by said drawing time predicting means.

15. A print processor according to claim 10, wherein said drawing time predicting means predicts the time it takes to draw each of a plurality of bands formed by dividing a single page.

16. A print processor according to claim 10, wherein said drawing process means draws each of a plurality of bands formed by dividing said drawing instructions of a single page.

17. A print processor according to claim 15, wherein said drawing time predicting means predicts the time it takes to draw each of said plurality of bands, and wherein said control means determines an image output speed slower than the longest of the predicted drawing times regarding said plurality of bands in said single page.

18. A print processor according to claim 10, wherein said single page is constituted by a plurality of specific regions including said specific region as well as by a plurality of different regions.

\* \* \* \* \*